US012797731B2

(12) United States Patent
Kametani

(10) Patent No.: US 12,797,731 B2
(45) Date of Patent: Nov. 17, 2026

(54) GAME PROGRAM, GAME PROCESSING METHOD, AND GAME SYSTEM

(71) Applicant: Konami Digital Entertainment Co., Ltd., Tokyo (JP)

(72) Inventor: Kiyoshi Kametani, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 163 days.

(21) Appl. No.: 18/623,375

(22) Filed: Apr. 1, 2024

(65) Prior Publication Data

US 2024/0245993 A1 Jul. 25, 2024

Related U.S. Application Data

(63) Continuation of application No. PCT/JP2022/037506, filed on Oct. 6, 2022.

(30) Foreign Application Priority Data

Oct. 6, 2021 (JP) ................................ 2021-164957

(51) Int. Cl.
*A63F 13/537* (2014.01)
*A63F 13/49* (2014.01)
*A63F 13/55* (2014.01)

(52) U.S. Cl.
CPC ............ *A63F 13/537* (2014.09); *A63F 13/49* (2014.09); *A63F 13/55* (2014.09)

(58) Field of Classification Search
CPC .......... A63F 13/45; A63F 13/49; A63F 13/55; A63F 13/58; A63F 13/822; A63F 13/833;
(Continued)

(56) References Cited

U.S. PATENT DOCUMENTS

2005/0014543 A1* 1/2005 Itoi ......................... A63F 13/45 463/8
2020/0139247 A1* 5/2020 Shigeta ................. A63F 13/795
2020/0306649 A1* 10/2020 Aita ...................... A63F 13/798

FOREIGN PATENT DOCUMENTS

JP 2015-131036 A 7/2015
JP 2016-159119 A 9/2016
(Continued)

OTHER PUBLICATIONS

International Search Report issued Dec. 6, 2022 in Application No. PCT/JP2022/037506.
(Continued)

*Primary Examiner* — Steven J Hylinski
(74) *Attorney, Agent, or Firm* — Sughrue Mion, PLLC

(57) ABSTRACT

In a competitive game between attacker and a defender, and each character associated with each attacker is movable over a game space created by the defender, based on operations by an attacker. An attacker operating a character acquires a specific object in the game space due to the character having reached the specific object. A winning condition for the attacker acquired the specific object is satisfied and a competitive play is ended for the attacker acquired the specific object, while continuing other competitive plays for the other attackers. A winning condition for the defender is satisfied and ending the competitive play for all of the defender and the attackers in case that the specific objects that remain not yet acquired by the attackers has not yet reached a predetermined status until a predetermined time elapses from start of the competitive play.

14 Claims, 14 Drawing Sheets

(58) Field of Classification Search
CPC ................ A63F 13/847; A63F 2300/63; A63F 2300/632; A63F 2300/8029; A63F 2300/807
See application file for complete search history.

(56) References Cited

FOREIGN PATENT DOCUMENTS

| | | | |
|---|---|---|---|
| JP | 2020-74840 | A | 5/2020 |
| KR | 10-2016-0144939 | A | 12/2016 |
| KR | 10-2267330 | B1 | 6/2021 |

OTHER PUBLICATIONS

Written Opinion issued Dec. 6, 2022 in Application No. PCT/JP2022/037506.
Communication dated Jul. 1, 2025 in Korean Application No. 10-2024-7006026.

* cited by examiner

G11

| MATCHING METHOD | MATCHING RANGE | ROOM SELECTION (BY ATTACKING USER) |
|---|---|---|
| QUICK MATCHING | UNSPECIFIED | NO |
| CONDITIONAL MATCHING | UNSPECIFIED | YES |
| FRIEND MATCHING | SPECIFIC | YES |
| DESIGNATED MATCHING | SPECIFIC | NO |

| MATCHING METHOD | CONSTRAINTS | | | | |
|---|---|---|---|---|---|
| | TEST PLAY | RULES | | | |
| | | TIME LIMIT | NUMBER OF ATTACKING USERS | NUMBER OF TREASURE CHESTS | NUMBER OF KEYS |
| QUICK MATCHING | CLEARED | 10 MINUTES OR MORE | 10 OR LESS | 5 OR MORE | 7 OR MORE |
| CONDITIONAL MATCHING | NO | 5 MINUTES OR MORE | 15 OR LESS | 3 OR MORE | 5 OR MORE |
| FRIEND MATCHING | NO | 5 MINUTES OR MORE | 15 OR LESS | 2 OR MORE | 3 OR MORE |
| DESIGNATED MATCHING | NO | NO | NO | NO | NO |

GAME PROGRAM, GAME PROCESSING METHOD, AND GAME SYSTEM

BACKGROUND OF THE INVENTION

Field of the Invention

The present invention relates to a game program, a game processing method, and a game system.

Description of Related Art

There is a competitive game in which teams compete against each other by attacking and defending (for example, Patent Document 1). Competitive games include, for example, a competitive game such as a so-called tower defense game in which a defending user and attacking users compete against each other using a game stage created by the defending user.

Patent Documents

[Patent Document 1] Japanese Unexamined Patent Application, First Publication No. 2015-131036

SUMMARY OF THE INVENTION

One of the most exciting aspects of the competitive game described above is that a plurality of attacking users cooperate in playing to conquer a game stage created by a defending user. On the other hand, however, some users find such cooperative play troublesome.

It is one of the objects of some aspects of the present invention to provide a game program, a game processing method, and a game system that reduce the cooperative element between users in a competitive game played by a plurality of users.

It is the object of another aspect of the present invention to provide a game program, a game processing method, and a game system that can achieve the advantages described in embodiments below.

An aspect of the present invention to solve the above problems is a game program that performs processing of a competitive game between a plurality of attacking users and at least one defending user, the game program causing a computer to perform moving each of characters of the plurality of attacking users in a game space created by the defending user based on an operation performed by a corresponding one of the plurality of attacking users in a competitive play in the competitive game, causing an attacking user among the plurality of attacking users who operates a character to acquire a specific object placed in the game space due to the character operated by the attacking user reaching the specific object, determining that a winning condition for the attacking user who has acquired the specific object among the plurality of attacking users is satisfied and ending the competitive play for the attacking user and continuing the competitive play for the other attacking users, and determining that a winning condition for the defending user is satisfied and ending the competitive play for all of the defending user and the attacking users when a remaining status of the specific objects that remain not acquired by the attacking users is kept from reaching a predetermined remaining status until a predetermined time elapses from start of the competitive play.

An aspect of the present invention is a game processing method performed by a computer that performs processing of a competitive game between a plurality of attacking users and at least one defending user, the game processing method including moving each of characters of the plurality of attacking users in a game space created by the defending user based on an operation performed by a corresponding one of the plurality of attacking users in a competitive play in the competitive game, causing an attacking user among the plurality of attacking users who operates a character to acquire a specific object placed in the game space due to the character operated by the attacking user reaching the specific object, determining that a winning condition for the attacking user who has acquired the specific object among the plurality of attacking users is satisfied and ending the competitive play for the attacking user and continuing the competitive play for the other attacking users, and determining that a winning condition for the defending user is satisfied and ending the competitive play for all of the defending user and the attacking users when a remaining status of the specific objects that remain not acquired by the attacking users is kept from reaching a predetermined remaining status until a predetermined time elapses from start of the competitive play.

An aspect of the present invention is a game system including a game device and a game server that communicates with the game device and performing processing of a competitive game between a plurality of attacking users and at least one defending user, the game system including a character control unit configured to move each of characters of the plurality of attacking users in a game space created by the defending user based on an operation performed by a corresponding one of the plurality of attacking users in a competitive play in the competitive game, an acquisition management unit configured to cause an attacking user among the plurality of attacking users who operates a character to acquire a specific object placed in the game space due to the character operated by the attacking user reaching the specific object, and a play management unit configured to determine that a winning condition for the attacking user who has acquired the specific object among the plurality of attacking users is satisfied and end the competitive play for the attacking user and continue the competitive play for the other attacking users and then to determine that a winning condition for the defending user is satisfied and end the competitive play for all of the defending user and the attacking users when a remaining status of the specific objects that remain not acquired by the attacking users is kept from reaching a predetermined remaining status until a predetermined time elapses from start of the competitive play.

DETAILED DESCRIPTION OF THE INVENTION

Hereinafter, embodiments of the present invention will be described with reference to the drawings.

First embodiment

First, a first embodiment of the present invention will be described.

Figure 1:
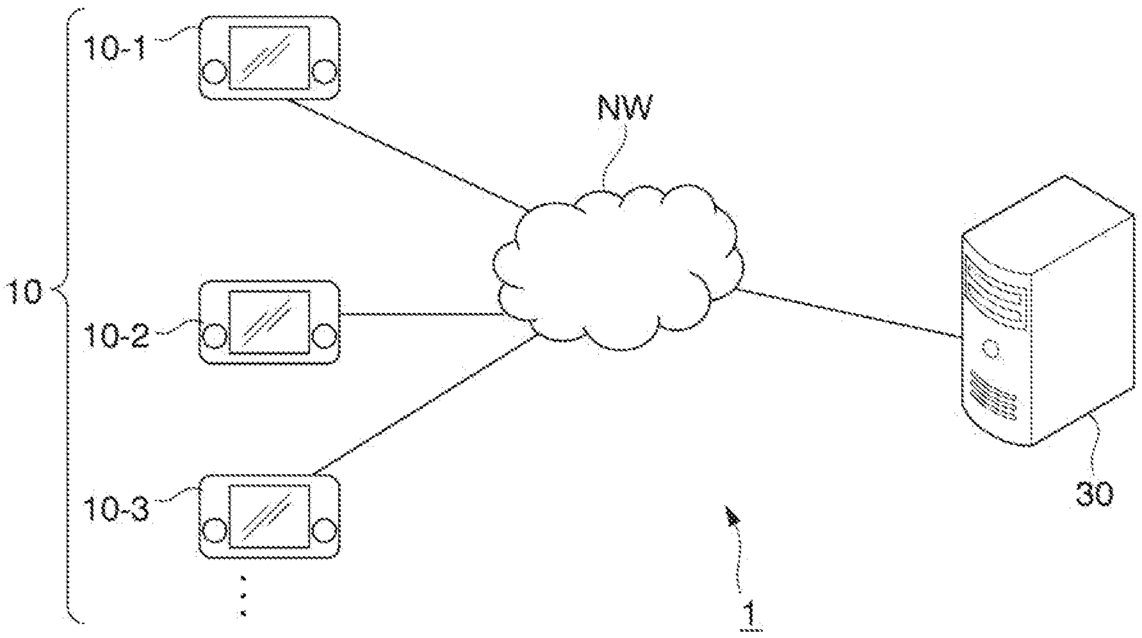
FIG. 1 is a schematic block diagram showing an example of a configuration of a game system according to a first embodiment.

FIG. 1 is a schematic block diagram showing an example of a configuration of a game system 1 according to the present embodiment. The game system 1 includes a plurality of game devices 10 (10-1, 10-2, 10-3, . . . ) and a game server 30. The plurality of game devices 10 and the game server 30 are communicatively connected via a network NW. The game devices 10-1, 10-2, and 10-3 have similar configurations and thus will be referred to as "game devices 10" with notations such as "−1" and "−2" omitted unless otherwise specified. Although three game devices 10 are shown here, any number of game devices 10 may be communicatively connected to the game server 30 via the network NW.

Each game device 10 is a computer device that a user can operate to play games and is, for example, a home game device (a stationary or portable game device), a personal computer (PC), a tablet PC, a mobile phone such as a smartphone or a feature phone, a personal digital assistant (PDA), or a business-use (commercial) game machine installed in a game center or the like.

The game server 30 stores and manages user information of users who play a game using the plurality of game devices 10. The game server 30 also performs a process of matching opponents (hereinafter referred to as a "matching process") when a plurality of users use their game devices 10 to play a competitive game through communication. For example, a user who plays using the game device 10-1 and a user who plays using the game device 10-2 can be matched as opponents to play a competitive game via the network NW. Note that matching of opponents is not limited to one-to-one matching and may be one-to-multiple matching or multiple-to-multiple matching.

The network NW includes, for example, the Internet, a mobile phone network, a virtual private network (VPN) network, a dedicated communication line network, a wide area network (WAN), a local area network (LAN), or a public switched telephone network (PSTN), or a communication network composed of a combination thereof.

Each game device 10 can also directly communicate with other game devices 10 through a peer to peer (P2P) connection or the like to play a competitive game.

Overview of Game

Next, an example of a game played by a user using a game device 10 according to the present embodiment will be described. The game according to the present embodiment is, for example, a competitive game between one defending user and a plurality of (for example, 10) attacking users. In a competitive play of this competitive game, based on operations performed by the defending user and the attacking users, their characters are moved in a game stage while destroying obstacles in the game stage or attacking their opponents using bombs to progress the game.

The game stage includes a game field (a game space) in which the characters of the defending user and the attacking users, for example, move or attack based on play operations performed by the defending user and the attacking users. The game field is, for example, a virtual space having three-dimensional information and may also be a two-dimensional virtual space. Restrictive objects (for example, blocks) that restrict the movement of characters and game objects and items that users can acquire using their characters are placed in the game field. The game stage includes game rules such as a time limit for a competitive play in a competitive game. That is, the game stage includes elements necessary to play a competitive game.

A game stage used in a competitive game can be one created by a defending user. A game stage used in a competitive game may be one prepared in advance for a competitive game or may be one to which a defending user has changed a part of a game stage prepared in advance.

Characters are a person, an animal, an object (for example, a vehicle), and the like that appear in a game and are, for example, warriors that are operated by users in this competitive game. Based on an operation performed by a user, it is possible to move his or her operated character in a game field, to attack using the character, and to acquire various game objects and items placed in the game field using the character. A defending user operates the defending user's character and an attacking user operates the attacking user's character. Characters appearing in the game may also include non-player characters (NPCs) controlled by the game device 10 (computer).

Figure 2:
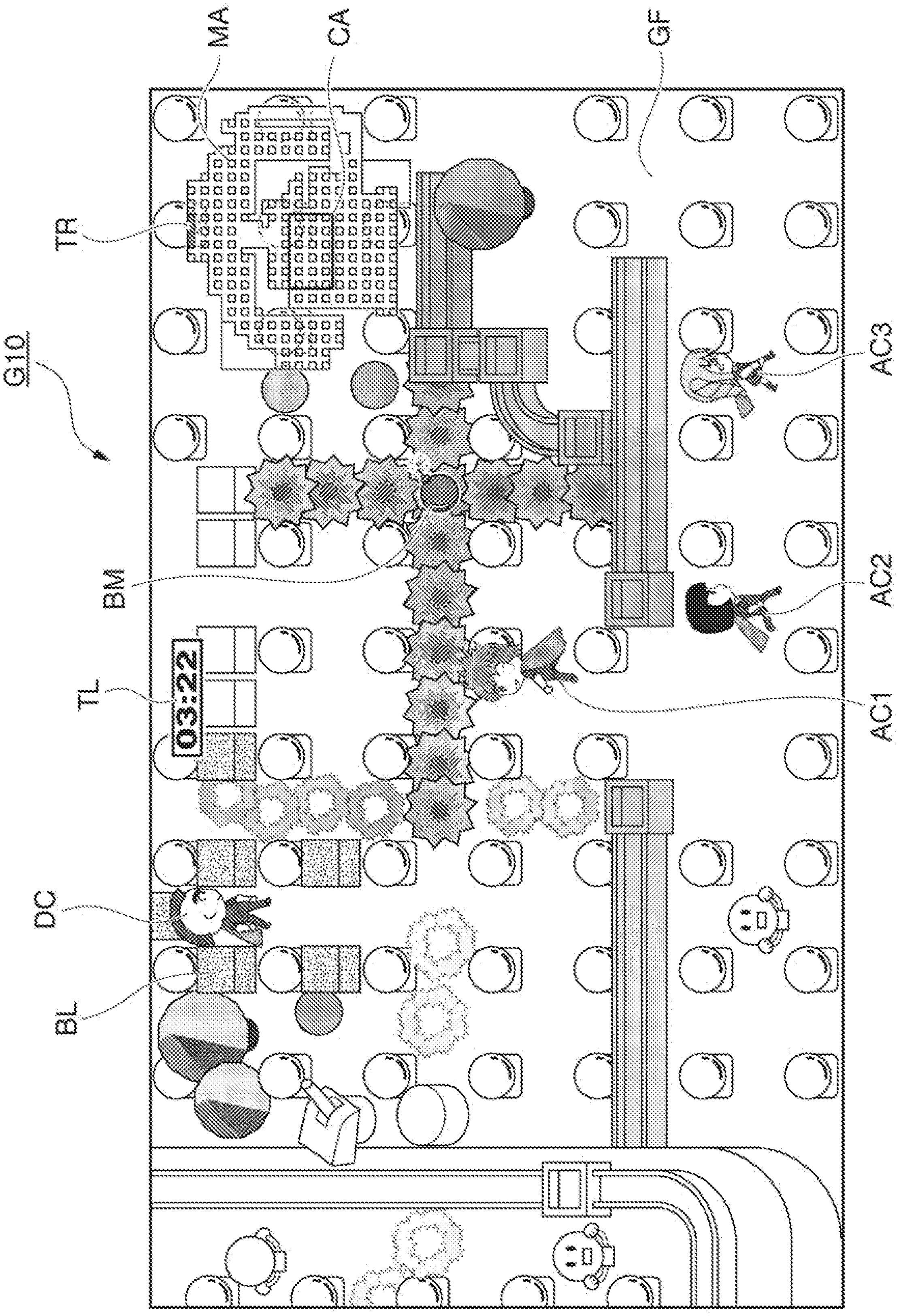
FIG. 2 is a diagram showing an example of a game screen according to the first embodiment.

FIG. 2 is a diagram showing an example of a game screen displayed by a game device 10 according to the present embodiment. The shown game screen G10 displays a game field GF of a game stage in which a user performs a competitive play in a competitive game. For example, the game screen G10 displays a partial area of the game field GF during a competitive play and a map MA corresponding to the entire area of the game field GF. Which area of the game field GF is displayed on the game screen G10 is controlled by each game device 10 such that the area includes the position of a character played by its user in the game field GF. The area of the game field GF displayed on the game screen G10 is indicated by a rectangular area CA on the map MA.

In the example shown in FIG. 2, the game screen G10 displays one defending user's character DC and three attacking users' characters AC1, AC2, and AC3 among characters present in the game field GF. For example, the game screen G10 shown in FIG. 2 is an example of a game screen displayed on a game device 10 on played by an attacking user who operates the character AC1.

Blocks BL that restrict the movement of characters are placed in the game field GF. The blocks BL are placed as obstacles that restrict the movement of characters such that they cannot move and are, for example, upright cube-shaped objects, although they may be objects of any shape. For example, the blocks BL include soft blocks and hard blocks. A soft block is destroyed and eliminated by a blast wave produced when a bomb BM explodes. When a soft block is destroyed and eliminated, a character can move to a location where the soft block was placed. On the other hand, hard blocks are not destroyed by the blast wave of a bomb BM.

A plurality of treasure chests are also placed in the game field GF. A treasure chest is an example of a game object placed in the game field GF and is a specific game object that affects the winning and losing of a competitive play. A treasure chest icon TR indicating a location where treasure chests are placed is displayed on the map MA of the game screen G10. An attacking user moves a character in a direction of coming closer to treasure chests with reference to the position of the treasure chest icon TR on the map MA, and when the location where the treasure chests are placed enters the area of the game field GF displayed on the game screen G10, the treasure chests are also displayed in the game field GF.

In this example, five treasure chests are placed at one location in the game field GF. The number of treasure chests is not limited to five and may be one or any number. The location where treasure chests are placed is also not limited to one location and for example, a plurality of treasure chests may be placed at different locations.

Although a competitive game according to the present embodiment is played by a large number of players, it is basically an individual game. For example, a plurality of attacking users each operate a character within the same game field GF to compete against a defending user, but at the same time, the attacking users are also opponents rather than teammates. Therefore, the blast wave of a bomb BM set by an attacking user affects (damages) not only the character of the defending user but also the characters of other attacking users. Because the competitive game is an individual game, even if there are many players, they do not need to cooperate, consult, or the like with other users as teammates and can easily participate in a competitive game.

A maximum number of people is set for each of the attacking side and the defending side (for example, ten people on the attacking side and one person on the defending side). The defending user includes the user who has created game stages used in competitive plays. A predetermined time limit (for example, 10 minutes) is set for each game stage and a competitive play is performed within the time limit. Time limit information TL indicating a remaining time until the time limit is displayed on the game screen G10 and is counted down as time elapses from the start of the competitive play until the time limit is reached.

Winning Conditions and Losing Conditions for Attacking and Defending Sides

A winning condition for an attacking user is acquiring one of a plurality of (for example, five) treasure chests placed in the game field GF. An attacking user can acquire a treasure chest by moving his or her operated character to a position where the treasure chest is placed. An attacking user may also be able to acquire a treasure chest by performing an operation to open the treasure chest and acquiring its contents after moving his or her character to a position where the treasure chest is placed. That is, acquiring a treasure chest includes acquiring the contents of a treasure chest.

An attacking user who has acquired a treasure chest satisfies the winning condition at that time and wins (or wins a victory), ending his or her competitive play. On the other hand, the competitive play continues for the other attacking users until the winning condition is satisfied or the time limit is reached. For example, when there are five treasure chests, there will be at most five winners who are attacking users. Attacking users who have not been able to acquire a treasure chest within the time limit satisfy a losing condition and become losers, ending their competitive play. That is, an attacking user who has been able to acquire a treasure chest within the time limit wins (becomes a winner) and an attacking user who has not been able to acquire a treasure chest within the time limit loses (becomes a loser).

The attacking user who satisfies the winning condition may be given a reward corresponding to the winning. The reward given is, for example, the contents of the treasure chest acquired by the attacking user who has satisfied the winning condition.

While an attacking user who has acquired a treasure chest wins (becomes a winner) (or wins a victory) at that time, ending his or her competitive play, the attacking user whose competitive play has ended may be able to watch the competitive play although he or she cannot continue to participate in the competitive play afterwards.

A winning condition for the defending user is protecting treasure chests from the attacking users until the time limit. If all of the plurality of treasure chests are acquired (taken) by the attacking users, the defending user satisfies a losing condition and loses (becomes a loser). Without being limited to this, the defending user may lose if a predetermined number of treasure chests among the plurality of treasure chests or a predetermined percentage of the plurality of treasure chests are taken. If the defending user remains in the state not satisfying the losing condition until the time limit, the defending user satisfies the winning condition and wins (becomes a winner).

As described above, the winning or losing of the attacking users and the defending user is determined based on the status of acquiring treasure chests placed in the game field GF by attacking users, that is, based on the remaining status of treasure chests that remain not acquired by attacking users.

Although the defending user is basically one user who has created the game stage used for play, there may be a plurality of defending users. When there are a plurality of defending users, the defending users also necessarily include the user who has created the game stage used for play.

When there are a plurality of defending users, only the defending side may play a team game and the winning or losing of only the defending side may be determined on a team basis. In this case as well, the attacking side will always play an individual game.

When a parameter such as a hit point (HP) has been set for each character that is operated by an attacking user in a competitive game with a rule that the attacking user operating the character loses at the time when the HP reaches zero, the defending user may satisfy the winning condition and win (become a winner) when the HPs of the characters of all attacking users reach zero.

Condition for Ending Competitive Game

A condition for ending a competitive game is that all treasure chests be acquired by the attacking users by the time limit or that the time limit elapses. When the condition for ending the competitive game is satisfied, the competitive play for all users ends and the competitive game ends.

When a parameter such as an HP has been set for each character, a condition for ending the competitive game may be that the number of surviving characters (characters whose HP does not reach zero) of the defending or attacking users become zero.

Item Required to Acquire Treasure Chest

In order for an attacking user to acquire a treasure chest, a "key" is required, which is an item necessary to acquire the treasure chest. The key is placed somewhere in the game field GF such that the attacking user can acquire it. Since the attacking user cannot acquire the treasure chest unless he or she has acquired this key, he or she need to first acquire the key.

An approximate position of the key is displayed, for example, on the map MA displayed on the game screen G10 and the attacking user searches for the key based on this information. A key mark is displayed on a character who possesses the key and the key is also displayed on the map MA. Alternatively, the position of the key may be initially hidden from the attacking user at the start of the competitive play. The attacking user may make the key appear when he or she has destroyed an obstacle such as a block (for example, a soft block) located at the position of the key using the blast wave of a bomb BM or the like. This can give a game property of searching for a key.

The position of the key in the game field GF may also be indicated by an icon on the map MA, similar to treasure chests.

An attacking user can acquire a key by moving his or her operated character to a position where the key is placed. An attacking user may also be able to acquire a key by performing an operation to pick up and acquire the key after moving his or her character to a position where the key is placed. This increases the number of elements for conquering the game stage as the attacking user does not merely head to the location of a treasure chest.

Once an attacking user has acquired a key, the attacking user may maintain the state of possession of the key, while attacking users may also struggle with each other for a key. For example, if the character of another attacking user who is in possession of a key is damaged by the blast wave of a bomb BM, the possession of the key may be transferred to the character of an attacking user who has damaged the character of the other attacking user. If the character of another attacking user who is in possession of a key is damaged by the blast wave of a bomb BM, the key may drop on the game field GF as if the character in possession of the key drops the key. The dropped key may be acquired by an attacking user on a first-come, first-served basis.

The defending user may also be able to recover a key from an attacking user using a bomb BM. If the defending user recovers a key, the key will be installed at a location in the game field GF. The location where the key is installed may be a preset location or may be any location in the game field GF.

When a parameter such as an HP has been set for each character that is operated by an attacking user in a competitive game with a rule that a character whose HP reaches zero respawns (dies once and restarts from a predetermined position), the character may be dispossessed of the key when the character's HP reaches zero and the key may be dropped at a position where the character's HP reaches zero.

When an attacking user who is in possession of a key acquires a treasure chest, the key in his or her possession disappears. The number of keys placed in the game field GF may basically be the same as the number of treasure chests and may also be greater than the number of treasure chests. The number of keys being greater than the number of treasure chests can lower the level of difficulty to acquire keys.

Even when an attacking user who is in possession of a key acquires a treasure chest, the key in his or her possession may not disappear and may be dropped on the game field GF. In this case, the relationship between the number of keys and the number of treasure chests is contrary to the relationship described above and the number of keys may be smaller than the number of treasure chests. Decreasing the number of keys can increase the level of difficulty to acquire keys because a struggle will occur.

The number of keys placed in the game field GF is determined to be an initial number (for example, three) at the start of the competitive play and a key may be newly placed and added based on an additional condition that is based on the passage of time (for example, after 5 minutes from the start of the competitive play) or based on an additional condition that is based on the progress of the competitive play (for example, a condition that all three initial keys have been used and disappeared). The number of keys that exist at the same time in the game field GF may be limited (for example, limited to two). Limiting the number of keys that exist at the same time can encourage attacking users to struggle with each other for the keys.

Notification of Remaining Status of Treasure Chests

Figure 3:
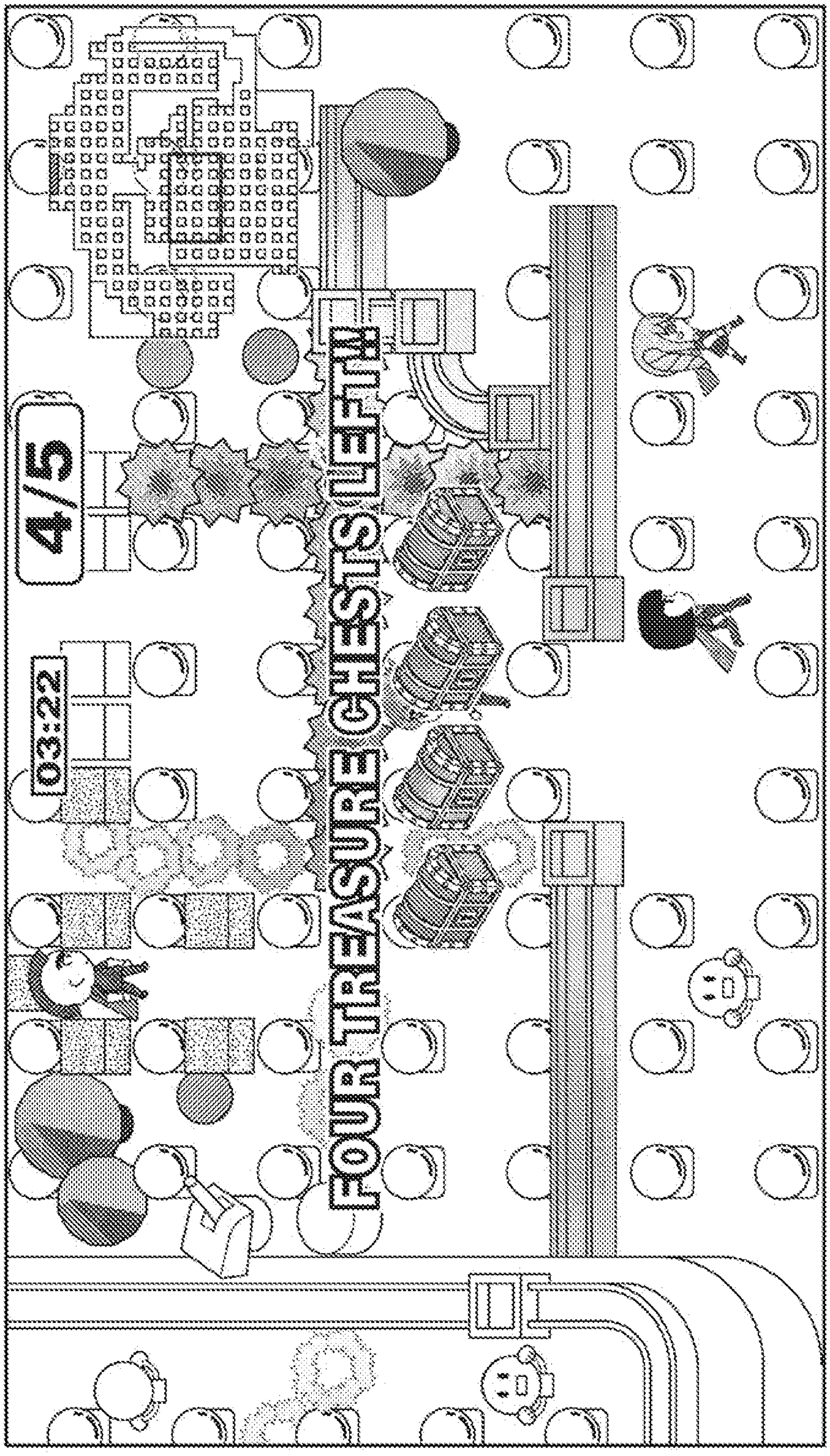
FIG. 3 is a diagram showing an example of notification of a remaining status of treasure chests according to the first embodiment.

If an attacking user acquires a treasure chest, changing the remaining status of treasure chests that remain in the game field GF, a user who is performing the competitive play may be notified as shown in FIG. 3.

FIG. 3 is a diagram showing an example of notification of the remaining status of treasure chests according to the present embodiment. A game screen G11 shown in FIG. 3 notifies that the number of treasure chests remaining in the game field GF has decreased from five to four since an attacking user acquires a treasure chest during the competitive play of the game screen G10 shown in FIG. 2. Text information and a picture of four treasure chests are displayed on the game screen G11 as information indicating that there are four treasure chests left.

Creation of Game Stage

Users can create game stages to be used in competitive plays. A user can use a game stage that the user has created when the user participates in a competitive play as a defending user. That is, a user creates a game stage assuming that the user competes against attacking users as a defending user. Creating a game stage includes creating a game field GF for a competitive play and setting game rules.

Figure 4:
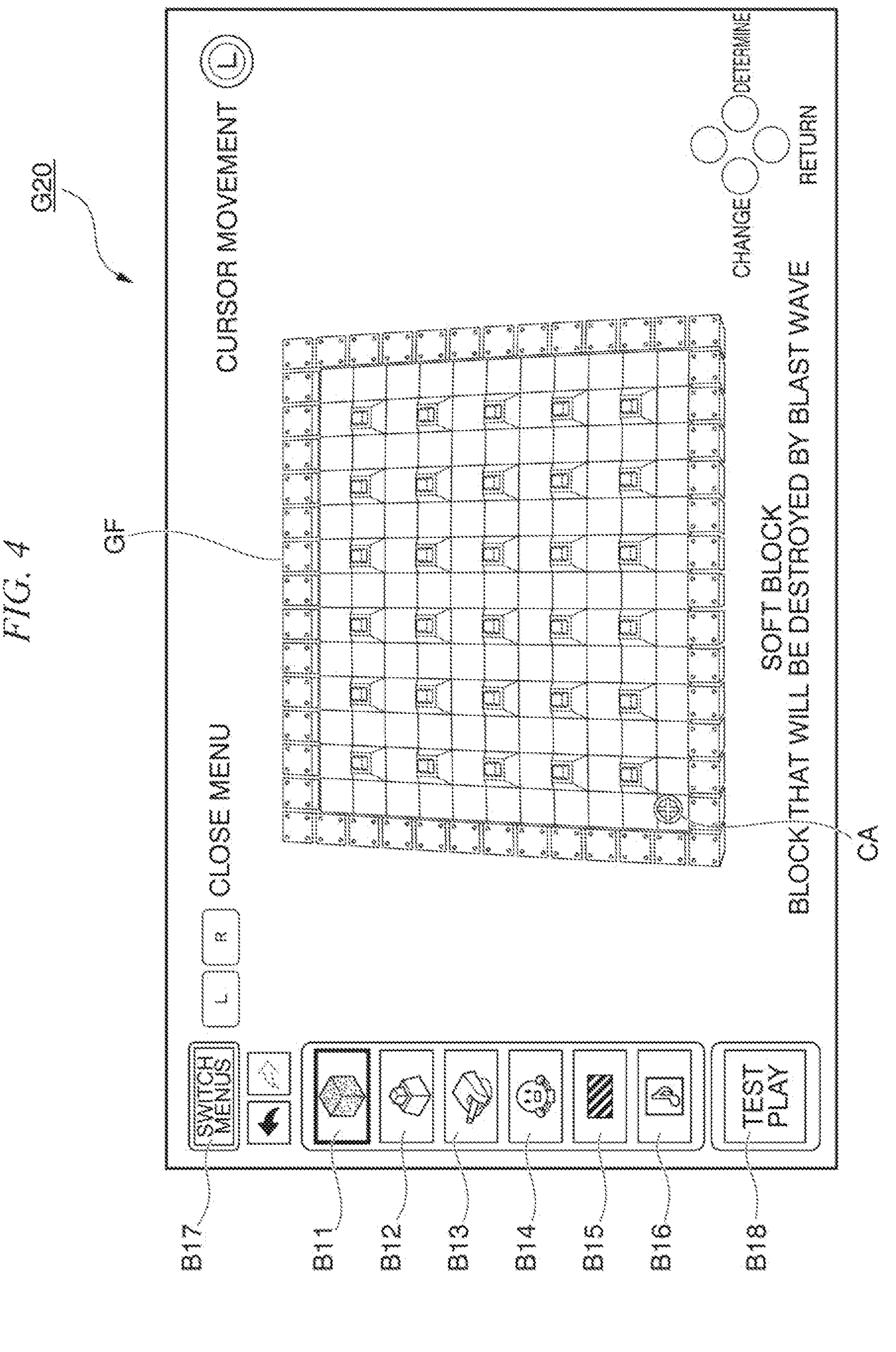
FIG. 4 is a diagram showing an example of a game stage creation screen according to the first embodiment.

FIG. 4 is a diagram showing an example of a game stage creation screen according to the present embodiment. A default game field GF is displayed in the center of the shown game stage creation screen G20. Here, although the game field GF is schematically displayed in a rectangular shape, the game field GF may be in any shape and a partial area of the game field GF may be displayed.

Icons lined up on the left side of the game field GF are operation buttons for selecting objects or the like that can be installed on the game field GF. The user selects one of these icons and places an object at an arbitrary position on the game field GF. An icon B11 and an icon B12 are operation buttons for selecting blocks which characters cannot enter, where the icon B11 is a soft block and the icon B12 is a hard block. An icon B13 is an operation button for selecting a weapon such as a cannon for attacking attacking characters. An icon B14 is an operation button for selecting an NPC for attacking attacking characters. Like objects, NPCs can be placed in the game field GF. An icon B15 is an operation button for selecting a trap to set against attacking characters. An icon B16 is an operation button for selecting a block where an item that improves the character's abilities will appear.

When an icon is selected, a description of an object to be installed with the selected icon is displayed at the bottom of the game field GF. In the shown example, the icon B11 is selected and a description of the soft block is displayed. Objects that can be placed in the game field GF are not limited to those of the example described above and can include any objects.

For example, the user selects an object from the icons B11 to B16 that the user desires to place on the game field GF and then moves a cursor CS to a desired position on the game field GF to determine its installation. Operations such as selecting an icon, moving the cursor CS, and determining installation can be performed using operation buttons provided on the game device 10, operation buttons on a controller connected to the game device 10, and the like.

An icon B17 is an operation button for switching menus. When the icon B17 is selected, the menu for selecting and installing the currently displayed icons B11 to B16 on the game field GF is switched to another menu (for example, a menu for setting game rules).

An icon B18 is an operation button for selecting a test play. The user can perform a test play by selecting this icon B18 after creating a game stage.

A plurality of base default game stages for creating a game stage may be preset and the user may create a game stage based on a game stage selected from the plurality of default game stages.

Figure 5:
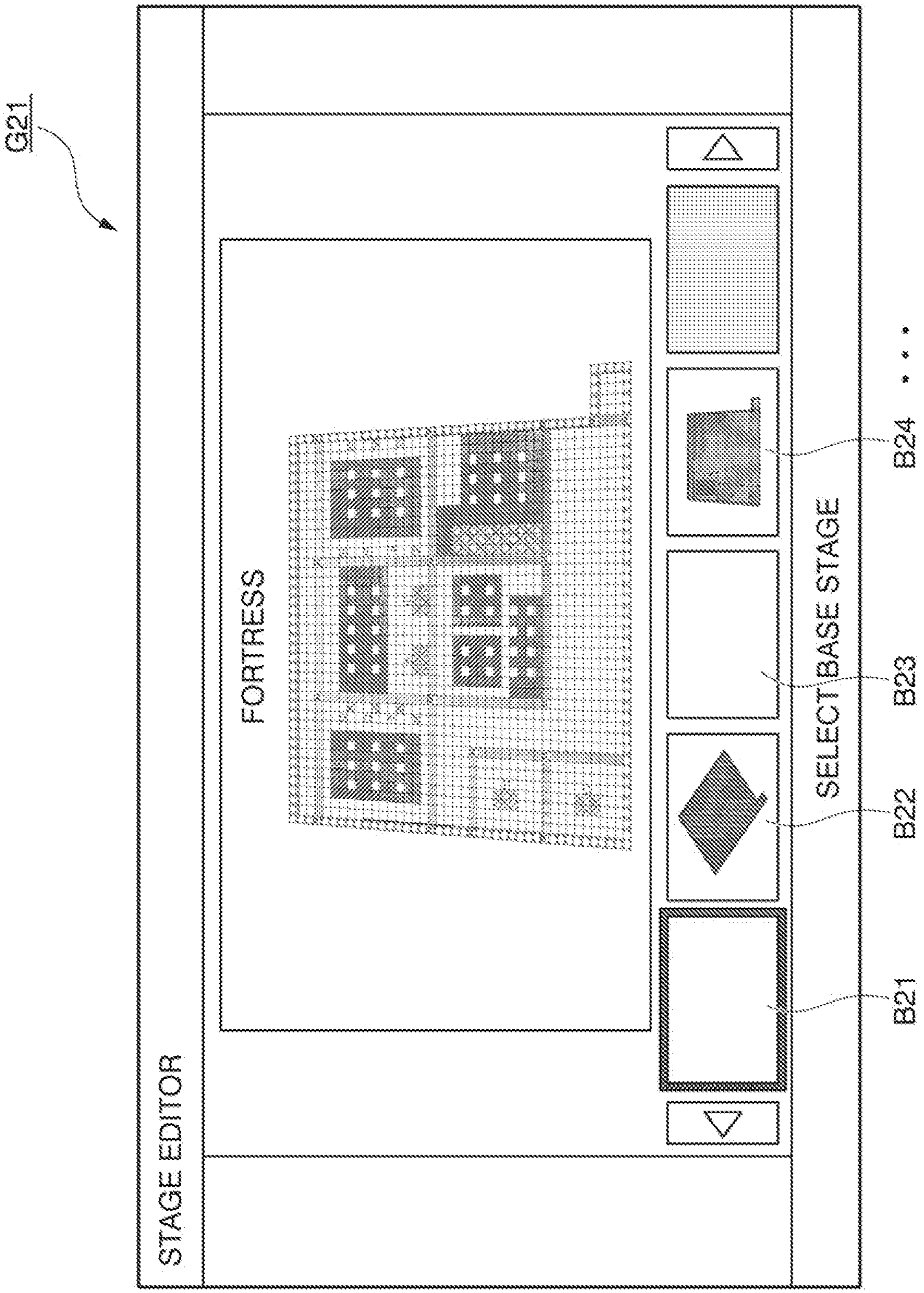
FIG. 5 is a diagram showing an example of a default game stage selection screen according to the first embodiment.

FIG. 5 is a diagram showing an example of a default game stage selection screen according to the present embodiment. The shown game stage selection screen G21 displays a plurality of base game stages such that they are selectable. Icons B21, B22, B23, B24, . . . are each associated with a base default game stage. A default game stage (for example, "stage A") associated with an icon selected from the icons B21, B22, B23, B24, . . . is displayed above these icons. When the user performs an operation to determine the selection in this state, the base default game stage is determined and the screen is switched to the game stage creation screen G20 (FIG. 3) on which a game field GF of the determined game stage is displayed. Operations such as selecting an icon and determining a game stage can be performed using operation buttons provided on the game device 10, operation buttons on a controller connected to the game device 10, and the like.

Game rules such as a time limit, the number of competing players (for example, the number of attacking users), the number of treasure chests, and the number of keys can be set in creating a game stage. Changing the settings of the game rules when creating a game stage as a defending user changes the level of difficulty of the game stage for attacking users. For example, increasing the time limit will decrease the level of difficulty for attacking users and shortening the time limit will increase the level of difficulty for attacking users. The number of competing players is a setting for an upper limit of the number of attacking users. The number of treasure chests and the number of keys can be set arbitrarily. For example, when a default game stage is selected, the locations of treasure chests and the locations of keys are preset in the selected game stage. The numbers can be set freely, while the locations are fixed. The locations of treasure chests and the locations of keys may also be set to arbitrary locations.

Upload of Game Stage

When a competitive game is to be played using a game stage created by a user, the created game stage may be uploaded to the game server 30 in advance, or when a competitive game is to be played, game stage data may be transmitted from a game device 10 of a defending user to game devices 10 of attacking users. It may also be possible to upload only game stages for which a test play has been cleared (game stages that the user has won in a test play as an attacking user). In this case, users other than the user who has created the game stages may use the uploaded game stages when playing a competitive game as a defending user.

Hardware Configuration of Game Device

Figure 6:
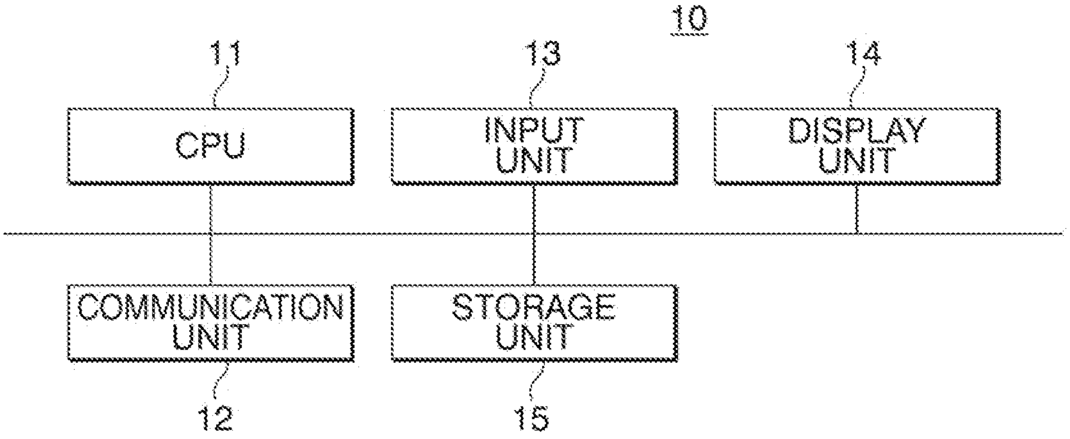
FIG. 6 is a block diagram showing an example of a hardware configuration of a game device according to the first embodiment.

FIG. 6 is a block diagram showing an example of a hardware configuration of the game device 10 according to the present embodiment. The game device 10 includes, for example, a central processing unit (CPU) 11, a communication unit 12, an input unit 13, a display unit 14, and a storage unit 15 and communicates with the game server 30, other devices, or the like which are connected via the network NW, through the communication unit 12. These components are communicatively connected to each other via a bus. The CPU 11 executes various programs such as game programs stored in the storage unit 15 and controls each component of the game device 10.

The communication unit 12 communicates game data or the like with the game server 30, other devices, or the like via the network NW under the control of the CPU 11. The communication unit 12 may also communicate game data or the like with other game devices 10 using short-range wireless communication or the like.

The input unit 13 includes a plurality of operation buttons through which user operations are input and outputs input operation information to the CPU 11. The input unit 13 may be a touch panel integrated with a display, a controller provided with a plurality of operation buttons, a keyboard, a mouse, a touch pad, or other input devices such as a microphone through which various instructions are input by voice. The input unit 13 may also be a controller or the like connected to the game device 10.

The display unit 14 includes, for example, a liquid crystal display panel or an organic electro luminescence (EL) display panel. For example, the display unit 14 displays the various game screens for a competitive game described above. The display unit 14 may also be an external display device such as a television or a monitor.

The storage unit 15 is, for example, a hard disk drive (HDD), a solid state drive (SSD), an electrically erasable programmable read-only memory (EEPROM), a read-only Memory (ROM), a random access memory (RAM) and stores game programs, game data, or the like. The storage unit 15 is not limited to one built into the game device 10 and may include an external storage device connected through a digital input/output port such as a USB.

The game device 10 may also include hardware components such as a speaker (not shown), an audio output terminal, a camera, a gyro sensor, and a global positioning system (GPS) receiving module.

Hardware Configuration of Game Server

Figure 7:
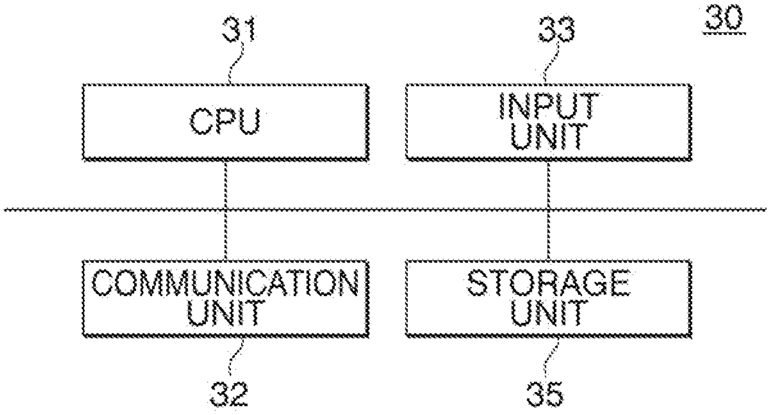
FIG. 7 is a block diagram showing an example of a hardware configuration of a game server according to the first embodiment.

FIG. 7 is a block diagram showing an example of a hardware configuration of the game server 30 according to the present embodiment. The game server 30 includes, for example, a CPU 31, a communication unit 32, an input unit 33, and a storage unit 35 and communicates with a plurality of game devices 10, other devices, or the like, which are connected via the network NW, through the communication unit 32. These components are communicatively connected to each other via a bus. The CPU 31 executes various programs stored in the storage unit 35 and controls each component of the game server 30.

The communication unit 32 communicates with the plurality of game devices 10 or other devices via the network NW under the control of the CPU 31.

The input unit 33 is, for example, a keyboard, a mouse, a touch pad, or other input devices such as a microphone through which various instructions are input by voice.

The storage unit 35 includes, for example, an HDD, an EEPROM, and a RAM and stores game control programs, application programs, various setting information, history information necessary for games, and the like. The storage unit 35 is not limited to one built into the game server 30 and may include an external storage device connected through a digital input/output port such as a USB. The storage unit 35 may be an external storage device physically separate from the game server 30 and may be connected to the game server 30 via the network NW. The game server 30 may also include hardware components such as a display unit, a speaker, and an audio output terminal (not shown).

Functional Configuration

Next, functional configurations of the game device 10 and the game server 30 included in the game system 1 will be described with reference to FIG. 8.

Figure 8:
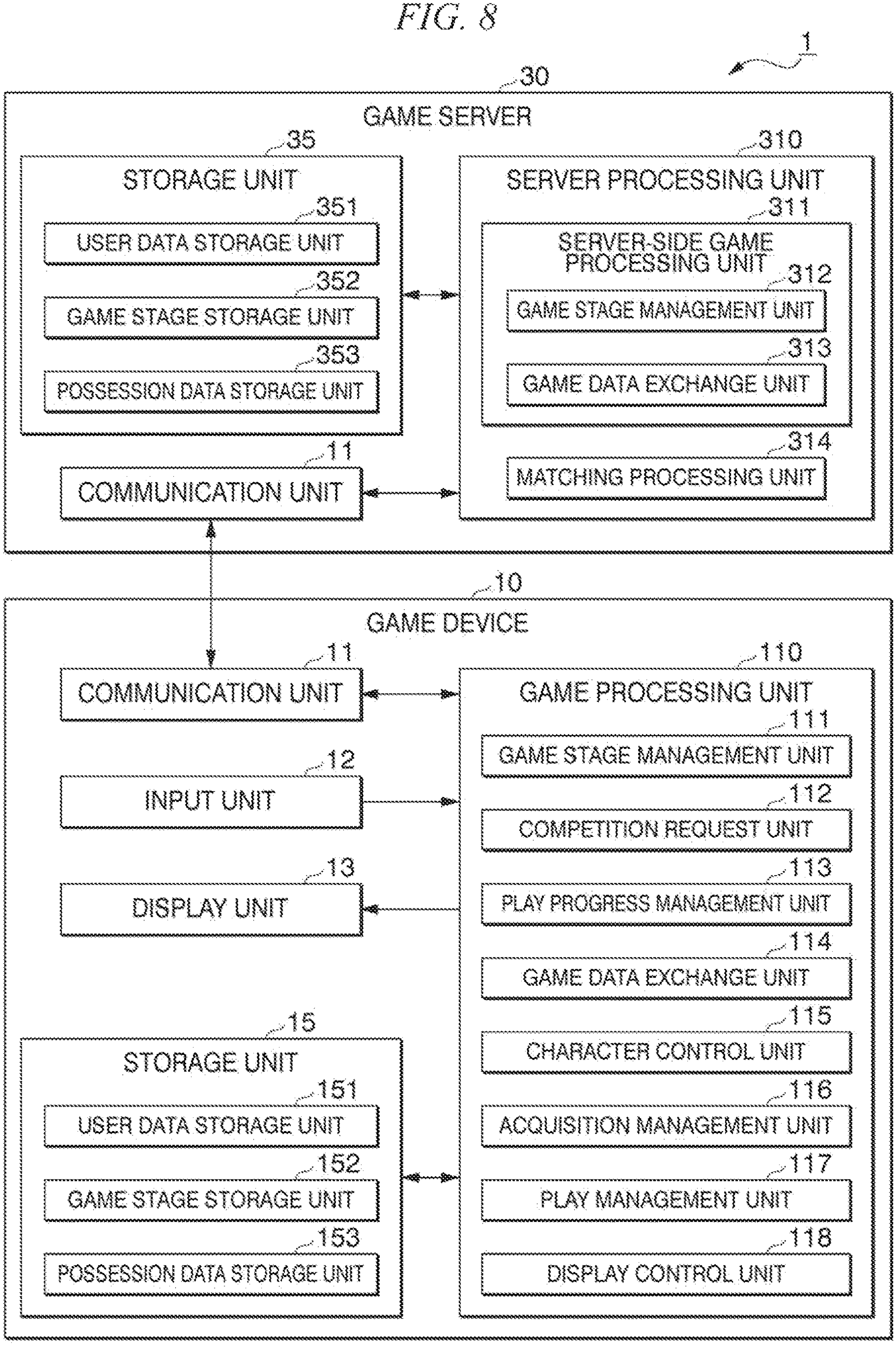
FIG. 8 is a block diagram showing an example of a functional configuration of a game device and a game server according to the first embodiment.

FIG. 8 is a block diagram showing an example of the functional configurations of the game device 10 and the game server 30 according to the present embodiment.

Functional Configuration of Game Device

First, the functional configuration of the game device 10 will be described.

The game device 10 includes a game processing unit 110 as a functional component implemented by the CPU 11 executing a game program stored in the storage unit 15. The game processing unit 110 controls the game processing of a competitive game based on an operation that the user has performed on the input unit 13. For example, the game processing unit 110 includes a game stage management unit 111, a competition request unit 112, a play progress management unit 113, a game data exchange unit 114, a character control unit 115, an acquisition management unit 116, a play management unit 117, and a display control unit 118. The storage unit 15 includes a user data storage unit 151, a game stage storage unit 152, and a possession data storage unit 153.

The game stage management unit 111 performs processing such as creating a game stage by the user and saving and uploading the created game stage. For example, the game stage management unit 111 performs processing to create a game field GF and sets game rules for competition in a game stage such as a time limit, the number of competing players, the number of treasure chests, and the number of keys, which are set by the user, based on an operation that the user has performed on the game stage creation screen G20, the default game stage selection screen G21, or the like as described with reference to FIGS. 4 and 5.

The game stage management unit 111 causes the game stage storage unit 152 to store data on the created game stage (game stage data). The game stage data contains a game stage ID as identification information for identifying the game stage, information on the base game stage (for example, stage A), information on the arrangement of objects and items in the game field GF, and game rule setting information, and the like. The game stage management unit 111 permits uploading of game stages for which a test play has been cleared. The game stage management unit 111 associates the game data with a user ID that is identification information of the user (creator) who has created the game stage and uploads the associated game data to the game server 30 via the communication unit 12 in response to an upload request from the user. User information (such as a user ID and a user name) of the user who plays on the game device 10 is stored in the user data storage unit 351.

The competition request unit 112 transmits a competition request to the game server 30 via the communication unit 12 based on an operation performed by the user when the user participates in a competitive game. At this time, the user selects whether to participate in the competitive game as a defender or as an attacker. When the user participates as a defender, the user selects a game stage to be used for the competition from the game stages created by the user. When transmitting a competition request for participating as a defender, the competition request unit 112 associates the game stage data of the selected game stage with the competition request for participating as a defender and transmits the associated game stage data to the game server 30. When transmitting a competition request for participating as an attacker, the competition request unit 112 transmits the competition request for participating as an attacker to the game server 30.

In response to the competition request unit 112 transmitting the competition request to the game server 30, the game server 30 performs a matching process to match the defending user and the attacking users. Upon acquiring the matching result from the game server 30, the play progress management unit 113 performs processing to start a competitive play. When the competitive play has started, the play progress management unit 113 counts the elapsed time from the start of the competitive play and manages the time limit for the competitive play.

The game data exchange unit 114 exchanges game data of users participating in the competitive play. The game data exchange unit 114 transmits play data of the user playing on the game device 10 (information regarding the position of the character, the position of a bomb BM that has been set, acquisition of treasure chests and keys, and the like) to other game devices 10 via the game server 30. The game data exchange unit 114 acquires play data of users playing on other game devices 10 from the other game devices 10 via the game server 30. Thus, the play states of the users participating in the competitive play can be shared between the game devices 10 and the states of the competitive play can be synchronized.

In a competitive play in a competitive game, the character control unit 115 moves each character in the game field GF created by the defending user based on an operation performed by a corresponding one of the plurality of attacking users. For example, the character control unit 115 moves the character of an attacking user who is playing on his or her own game device 10 based on an operation performed by the attacking user. On the other hand, the character control unit 115 moves the characters of attacking users who are playing on other game devices 10 based on operations performed by the attacking users, based on play data that the game data exchange unit 114 has acquired from the other game devices 10 via the game server 30.

When the user playing with his or her own game device 10 is a defending user in a competitive play in a competitive game, the character control unit 115 moves the character of the defending user based on an operation performed by the defending user. On the other hand, when the defending user is playing on another game device 10, the character control unit 115 moves the character of the defending user based on an operation performed by the defending user, based on play data that the game data exchange unit 114 has acquired from the other game devices 10 via the game server 30.

Due to a character of one of the attacking users reaching a key placed in the game field GF, the acquisition management unit 116 causes the attacking user who operates the character to acquire the key that the character has reached. The acquisition management unit 116 causes an attacking user to acquire a key, for example, when the attacking user's character has moved to the position of the key placed in the game field GF or when the attacking user has performed an operation to pick up and acquire the key after moving to the position of the key.

The acquisition management unit 116 may cause an attacking user to acquire a key that has already been acquired by another attacking user. For example, an attacking user can acquire a key by damaging the character of another attacking user who has already acquired the key with the blast wave of a bomb BM or the like and causing the character to drop the key. The acquisition management unit 116 causes an attacking user to acquire a key when the attacking user's character has moved to the position of the key dropped by another attacking user or when the attacking user's character has performed an operation to pick up and acquire the key after moving to the position of the key.

Due to a character of one of the attacking users reaching a treasure chest placed in the game field GF, the acquisition management unit 116 causes the attacking user who operates the character to acquire the treasure chest that the character has reached. The acquisition management unit 116 causes an attacking user to acquire a treasure chest, for example, when the attacking user's character has moved to the position of the treasure chest placed in the game field GF or when the attacking user has performed an operation to acquire the contents of the treasure chest after moving to the position of the treasure chest.

Here, the acquisition management unit 116 sets the acquisition of a key as a condition for acquiring a treasure chest. Specifically, due to the character of an attacking user, who has acquired a key, reaching one of a plurality of treasure chests placed in the game field GF, the acquisition management unit 116 causes the attacking user who operates the character to acquire the treasure chest that the character has reached. On the other hand, even if the character of an attacking user who has not acquired a key reaches a treasure chest, the acquisition management unit 116 does not cause the attacking user to acquire the treasure chest.

The acquisition management unit 116 causes the possession data storage unit 153 to store data on the treasure chest and key acquired by the attacking user in association with the user ID as the user's possession data.

The play management unit 117 ends the competitive play for an attacking user who has acquired a treasure chest among the plurality of attacking users, assuming that the winning condition is satisfied. On the other hand, the play management unit 117 continues the competitive play for attacking users other than the attacking user who has acquired the treasure chest. Each time another attacking user acquires a treasure chest, the play management unit 117 ends only the competitive play for the attacking user who has acquired the treasure chest, assuming that the winning condition is satisfied. Then, if all of the plurality of attacking users acquire a treasure chest before the time limit elapses, the play management unit 117 ends the competitive play for all attacking users, assuming that the winning conditions for all attacking users are satisfied. On the other hand, the play management unit 117 ends the competitive play for an attacking user who has not acquired a treasure chest until the time limit elapses, assuming that the losing condition is satisfied.

If the remaining status of treasure chests that remain not acquired by attacking users is kept from reaching a predetermined remaining status (for example, the number of remaining treasure chests being zero) until the time limit elapses from the start of the competitive play, the play management unit 117 determines that a winning condition for the defending user is satisfied and ends the competitive play for all of the defending user and the attacking users (attacking users who are performing their competitive play at that time). If all of the plurality of attacking users acquire a treasure chest before the time limit elapses, the play management unit 117 determines that the losing condition for the defending user is satisfied and ends his or her competitive play.

The play management unit 117 may give a reward corresponding to winning to an attacking user who has acquires a treasure chest and satisfied the winning condition. For example, the play management unit 117 causes the user data storage unit 151 to store reward acquisition information in which information indicating the contents of the treasure chest acquired by the attacking user is associated with the user ID of the attacking user. When the play management unit 117 has caused the user data storage unit 151 to store the reward acquisition information, the game data exchange unit 114 transmits the reward acquisition information to the game server 30 and causes the user data storage unit 351 to store it as well.

The display control unit 118 generates drawing data for a video to be displayed on a game screen in a competitive game and causes the display unit 14 to display the data. For example, the game screen includes various game screens such as the game screen G10 of FIG. 2, the game screen G11 of FIG. 3, the game stage creation screen G20 of FIG. 4, and the game stage selection screen G21 of FIG. 5.

The game processing unit 110 performs various other game processing. For example, the game processing unit 110 performs control to place a bomb BM based on an operation that an attacking user or a defending user has performed to set a bomb BM or performs control to detonate the bomb BM to damage characters present within a predetermined range (for example, reduce their HP) by a blast wave.

The game processing unit 110 may newly place a key in the game field GF based on a predetermined additional condition. For example, the game processing unit 110 may newly place and add a key in the game field GF based on an additional condition that is based on the passage of time from the start of the competitive play (for example, after 5 minutes from the start of the competitive play) or based on an additional condition that is based on the progress of the competitive play (for example, a condition that all three initial keys have been used and disappeared).

Functional Configuration of Game Server 30

Next, the functional configuration of the game server 30 will be described.

The game server 30 includes a server processing unit 310 as a functional component implemented by the CPU 31 executing a game program stored in the storage unit 35. For example, the server processing unit 310 includes a server-side game processing unit 311 that performs server-side processing of the game processing of a competitive game and a matching processing unit 314 that performs a matching process to match opponents in a competitive game. The storage unit 35 includes a user data storage unit 351, a game stage storage unit 352, and a possession data storage unit 353.

The user data storage unit 351 stores user information (such as users ID and user names) of a plurality of users (registered users) who can participate in a competitive game. The user data storage unit 351 also stores information indicating the relationship between a plurality of users (for example, friend information) as user information.

The game stage storage unit 352 stores game stage data of game stages created and uploaded by users in association with user IDs of the creators.

The possession data storage unit 353 stores possession data of a plurality of attacking users during a competitive play. For example, the possession data storage unit 353 stores data on treasure chests and keys acquired by attacking users during a competitive play in association with user IDs of the attacking users.

The server-side game processing unit 311 includes a game stage management unit 312 and a game data exchange unit 313.

The game stage management unit 312 associates game stage data uploaded from the game device 10 with the user ID of the creator and causes the game stage storage unit 352 to store the associated game stage data. The game stage management unit 312 also provides a game stage that is based on the stored game stage data such that it can be used in a competitive game. For example, the game stage management unit 312 may provide an uploaded game stage such that users other than the creator can use it.

The game data exchange unit 313 acquires game data of users participating in a competitive play from game devices 10 of the users participating in the competitive play. The game data exchange unit 313 transmits game data of each user acquired from each game device 10 to each game device 10 participating in the competitive play. Thus, the play states of the users participating in the competitive play can be shared between the game devices 10 and the states of the competitive play can be synchronized.

The matching processing unit 314 performs a matching process to match a defending user and an attacking user who are to perform a competitive play in a competitive game. For example, upon acquiring a competition request that each game device 10 has transmitted to participate in a competitive game as a defender or an attacker, the matching processing unit 314 selects a defending user and attacking users from users who have transmitted the competition request. When a match is established, the matching processing unit 314 transmits the matching result to game devices 10 of the matched users and causes them to start the competitive play. Details of this matching process will be described in a second embodiment.

Game Processing Operations

Figure 9:
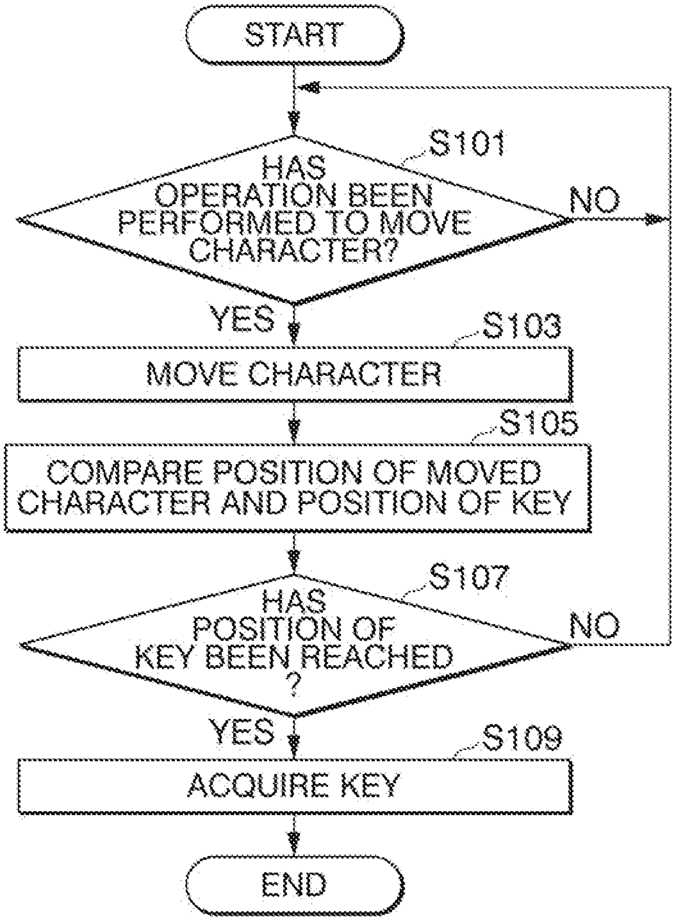
FIG. 9 is a flowchart showing an example of a process for acquiring a key by an attacking user according to the first embodiment.

Next, game processing operations performed by the CPU 11 of the game device 10 will be described. FIG. 9 is a flowchart showing an example of a process for acquiring a key by an attacking user according to the present embodiment.

The CPU 11 determines whether the attacking user has performed an operation to move the character (step S101). Upon determining that no operation has been performed to move the character (step S101: NO), the CPU 11 performs the process of step S101 again. On the other hand, upon determining that an operation has been performed to move the character (step S101: YES), the CPU 11 moves the character in accordance with the operation (step S103).

Next, the CPU 11 compares the position of the moved character and the position of a key (step S105). Then, the CPU 11 determines whether the character of the attacking user has reached the position of the key based on the result of comparison between the position of the moved character and the position of the key (step S107).

Upon determining that the character of the attacking user has not reached the position of the key (step S107: NO), the CPU 11 returns to the process of step S101. On the other hand, upon determining that the character of the attacking user has reached the position of the key (step S107: YES), the CPU 11 causes the attacking user to acquire the key and causes the possession data storage unit 153 to store it as possession data (step S109).

Figure 10:
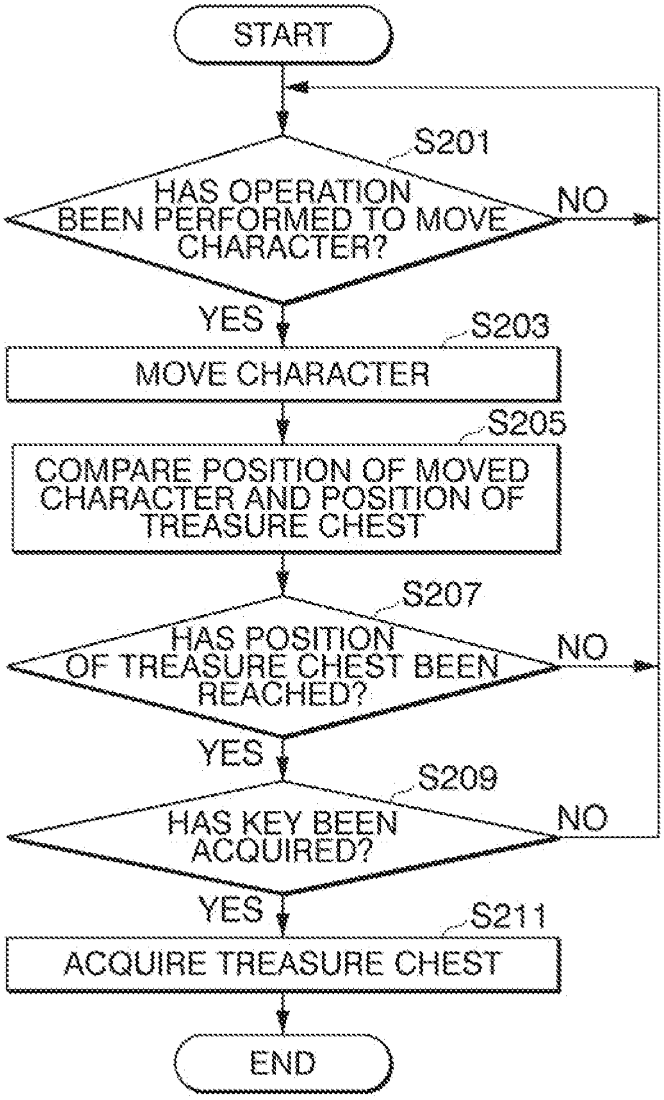
FIG. 10 is a flowchart showing an example of a process for acquiring a treasure chest by an attacking user according to the first embodiment.

FIG. 10 is a flowchart showing an example of a process for acquiring a treasure chest by an attacking user according to the present embodiment.

The CPU 11 determines whether the attacking user has performed an operation to move the character (step S201). Upon determining that no operation has been performed to move the character (step S201: NO), the CPU 11 performs the process of step S101 again. On the other hand, upon determining that an operation has been performed to move the character (step S201: YES), the CPU 11 moves the character in accordance with the operation (step S203).

Next, the CPU 11 compares the position of the moved character and the position of a treasure chest (step S205). Then, the CPU 11 determines whether the character of the attacking user has reached the position of the treasure chest based on the result of comparison between the position of the moved character and the position of the treasure chest (step S207).

Upon determining that the character of the attacking user has not reached the position of the treasure chest (step S207: NO), the CPU 11 returns to the process of step S201. On the other hand, upon determining that the character of the attacking user has reached the position of the treasure chest (step S207: YES), the CPU 11 refers to possession data stored in the possession data storage unit 153 and determines whether the attacking user has acquired a key (step S209).

Upon determining that the attacking user who has reached the position of the treasure chest has not acquired a key (step S209: NO), the CPU 11 returns to the process of step S201. On the other hand, upon determining that the attacking user who has reached the position of the treasure chest has acquired a key (step S209: YES), the CPU 11 causes the attacking user to acquire the treasure chest and causes the possession data storage unit 153 to store it as possession data (step S211).

Figure 11:
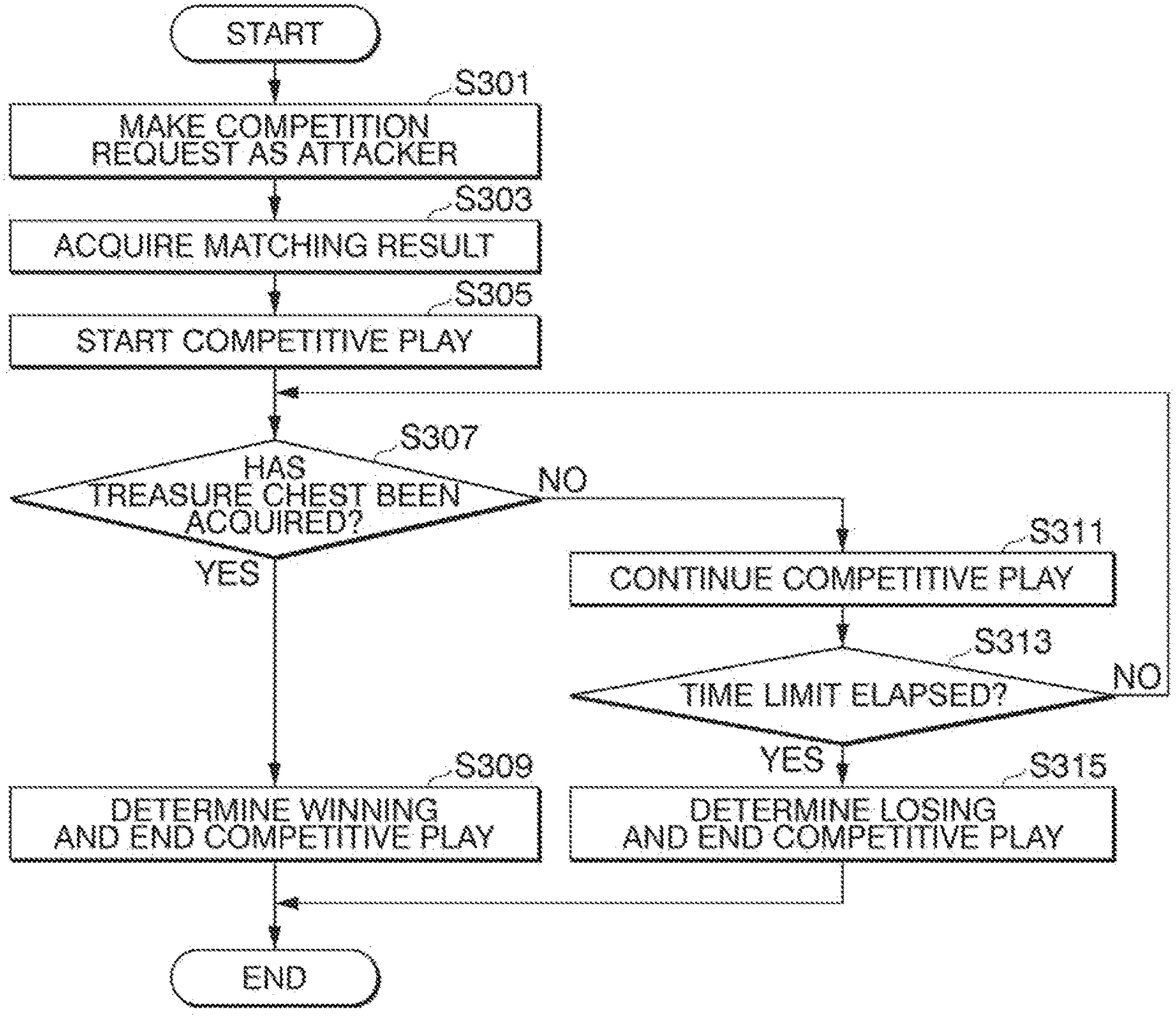
FIG. 11 is a flowchart showing an example of a process for starting and ending a competitive play by an attacking user according to the first embodiment.

FIG. 11 is a flowchart showing an example of a process for starting and ending a competitive play by an attacking user according to the present embodiment.

The CPU 11 transmits a competition request for participating as an attacker to the game server 30 based on an operation performed by the user (step S301). After transmitting the competition request, the CPU 11 acquires a matching result when a match is established (step S303). Then, upon acquiring the matching result, the CPU 11 starts a competitive play (step S305).

In the competitive play, the CPU 11 determines whether the attacking user has acquired a treasure chest (step S307). Upon determining that the attacking user has acquired a treasure chest (step S307: YES), the CPU 11 determines that a winning condition is satisfied and ends the competitive play for the attacking user who has acquired the treasure chest (step S309).

On the other hand, upon determining that the attacking user has not acquired a treasure chest (step S307: NO), the CPU 11 causes the attacking user to continue the competitive play (step S311). Then, the CPU 11 determines whether a time limit has elapsed from the start of the competitive play (step S313).

Upon determining that the time limit has not elapsed (step S313: NO), the CPU 11 returns to the process of step S307. On the other hand, upon determining that the time limit has elapsed (step S313: YES), the CPU 11 determines that a losing condition is satisfied and ends the competitive play for the attacking user who has not acquired a treasure chest (step S315).

Figure 12:
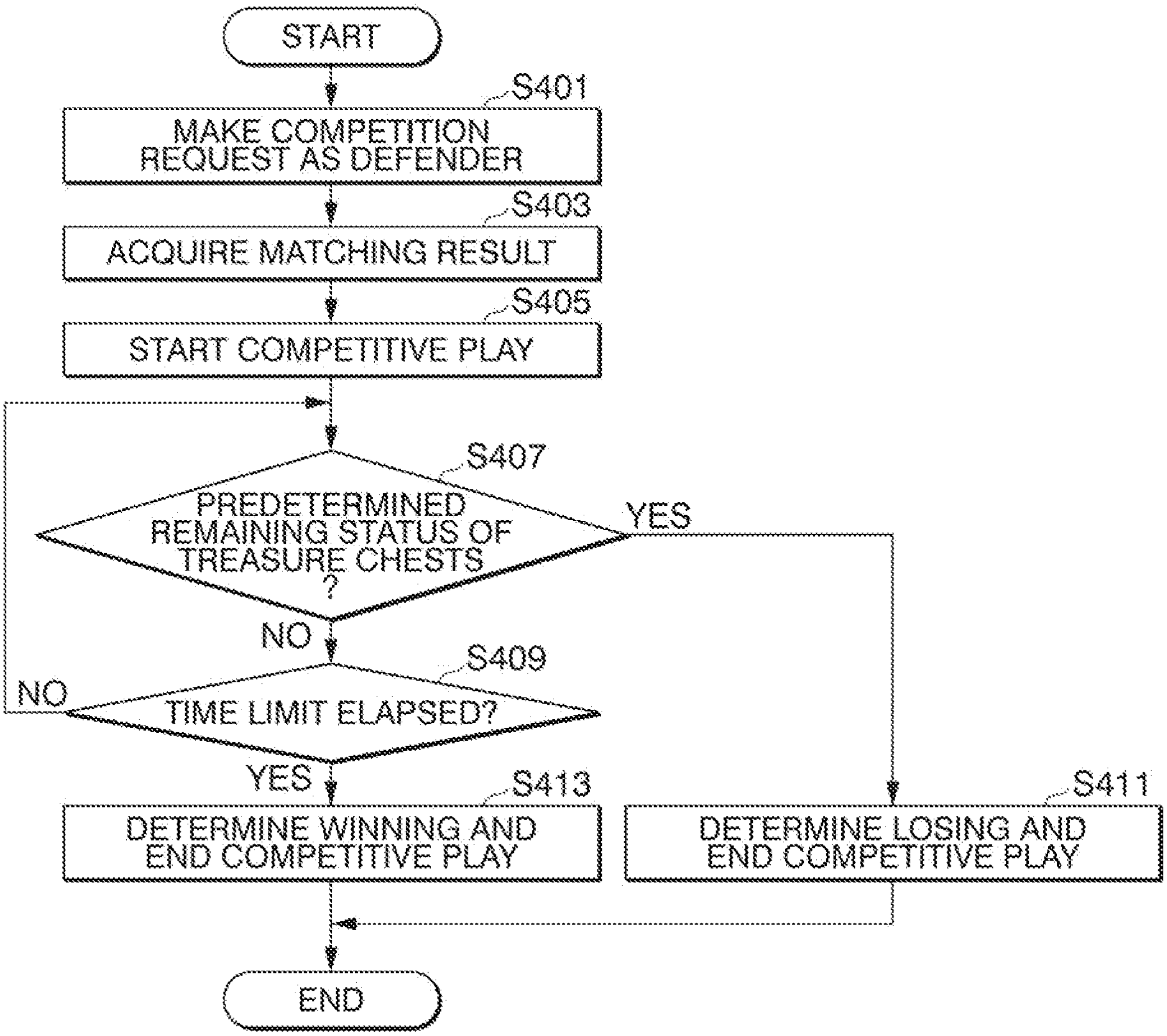
FIG. 12 is a flowchart showing an example of a process for starting and ending a competitive play by a defending user according to the first embodiment.

FIG. 12 is a flowchart showing an example of a process for starting and ending a competitive play by a defending user according to the present embodiment.

The CPU 11 transmits a competition request for participating as a defender to the game server 30 based on an operation performed by the user (step S401). After transmitting the competition request, the CPU 11 acquires a matching result when a match is established (step S403). Then, upon acquiring the matching result, the CPU 11 starts a competitive play (step S405).

In the competitive play, the CPU 11 determines whether the remaining status of treasure chests that remain not acquired by attacking users has reached a predetermined remaining status (for example, the number of remaining treasure chests being zero) (step S407). Upon determining that the remaining status of treasure chests has reached the predetermined remaining status (step S407: YES), the CPU 11 determines that a losing condition is satisfied and ends the competitive play for the defending user (step S411).

On the other hand, upon determining that the remaining status of treasure chests has not reached the predetermined remaining status (step S407: NO), the CPU 11 determines whether the time limit has elapsed from the start of the competitive play (step S409). Upon determining that the time limit has not elapsed (step S409: NO), the CPU 11 returns to the process of step S407.

On the other hand, upon determining that the time limit has elapsed (step S409: YES), the CPU 11 determines that a winning condition is satisfied and ends the competitive play for the defending user (step S413).

Summary of First Embodiment

As described above, the game system 1 according to the present embodiment includes a game device 10 and a game server 30 that communicates with the game device 10 and performs the processing of a competitive game between a plurality of attacking users and at least one defending user. For example, the game device 10 includes a character control unit 115, an acquisition management unit 116, and a play management unit 117. In a competitive play in a competitive game, the character control unit 115 moves each character in the game field GF (an example of a game space) created by the defending user based on an operation performed by a corresponding one of the plurality of attacking users. Due to a character of one of the attacking users reaching a treasure chest (an example of a specific object) placed in the game field GF, the acquisition management unit 116 causes the attacking user who operates the character to acquire the treasure chest that the character has reached. The play management unit 117 determines that the winning condition for an attacking user who has acquired a treasure chest among the plurality of attacking users is satisfied and ends the competitive play for the attacking user and continues the competitive play for other attacking users. If the remaining status of treasure chests that remain not acquired by attacking users is kept from reaching a predetermined remaining status (for example, the number of remaining treasure chests being zero) until the time limit (an example of a predetermined time) elapses from the start of the competitive play, the play management unit 117 determines that a winning condition for the defending user is satisfied and ends the competitive play for all of the defending user and the attacking users. Here, a treasure chest is just an example and any specific object may be used instead of a treasure chest.

Accordingly, the game system 1 can provide a game with a reduced cooperative element between users in a competitive game between a plurality of users, because the game is basically an individual game even if it is a competitive game between a plurality of attacking users and a defending user. Thus, users do not need to cooperate, consult, or the like with other users as teammates and can easily participate in a competitive game.

If all of the plurality of attacking users acquire a treasure chest before the time limit elapses, the play management unit 117 ends the competitive play for all attacking and defending users, assuming that the winning conditions for all attacking users are satisfied. In this case, the play management unit 117 ends the competitive play for the defending user, assuming that the losing condition for the defending user is satisfied.

Accordingly, while the game system 1 can provide an individual game because the winning or losing of each attacking user and the defending user is determined based on whether each of the plurality of attacking users has acquired a treasure chest within the time limit, the game system 1 can also provide a team game element because the final losing of the defending user is determined by the play results of all attacking users.

A key (an example of an item) necessary for an attacking user to acquire a treasure chest is placed in the game field GF such that the attacking user can acquire it. Due to the character of an attacking user, who has acquired a key, reaching one of a plurality of treasure chests placed in the game field GF, the acquisition management unit 116 causes the attacking user who operates the character to acquire the treasure chest that the character has reached. On the other hand, even if the character of an attacking user who has not acquired a key reaches a treasure chest, the acquisition management unit 116 does not cause the attacking user to acquire the treasure chest. Here, a key is just an example and any item may be used instead of a key.

Accordingly, the game system 1 can increase the number of elements for conquering the game stage, improving the game properties, because the attacking user does not merely head to the location of a treasure chest.

For example, an attacking user can acquire a key placed in the game field GF and a key already acquired by another attacking user. For example, an attacking user can acquire a key by damaging the character of another attacking user who has already acquired the key with the blast wave of a bomb BM and causing the character to drop the key.

Accordingly, the game system 1 can increase the level of difficulty to head to a treasure chest with a key acquired because attacking users can struggle with each other for the key.

The key placed in the game field GF is newly placed in the game field GF based on a predetermined additional condition.

Accordingly, the game system 1 can encourage attacking users to struggle with each other for keys by keeping the number of keys smaller than the number of treasure chests at the start of the competitive play.

The predetermined additional condition for newly placing a key in the game field GF is a condition based on the passage of time from the start of the competitive play (for example, 5 minutes after the start of the competitive play).

Accordingly, the game system 1 can encourage attacking users to struggle with each other for keys by keeping the number of keys smaller than the number of treasure chests at the start of the competitive play. Here, the predetermined additional condition for newly placing a key in the game field GF may be an additional condition based on the progress of the competitive play (for example, a condition that all three initial keys have been used and disappeared).

When creating the game field GF, the defending user can customize at least a block (an example of a restrictive object) that restricts the movement of characters in the game field GF. For example, when creating a game field GF, the defending user can place soft blocks or hard blocks in the game field GF and move or eliminate the placed blocks.

Accordingly, the game system 1 can create a game stage by adjusting the level of difficulty of movement of the attacking user's character. For example, the defending user can create a plurality of game stages with different levels of difficulty, such that it is possible to use a game stage with a different level of difficulty for each competition.

Second Embodiment

Next, a second embodiment of the present invention will be described.

In the present embodiment, details of a matching process for matching a defending user and an attacking user who are to perform a competitive play will be described.

In the game system 1, a competitive game can be played with various users using a game stage created by a defending user as described in the first embodiment. There are restrictions on game stages that are usable depending on a matching method used to determine opponents when playing a competitive game.

When a user plays a competitive game, the user first selects whether to participate in the competitive game as an attacker or a defender and then selects a matching method. Basically, the defending user is an owner for matching. An owner refers to a user who has created a room. A room is used to invite attacking users to a competition to be played on a game stage created by a defending user and to accept users other than the owner to participate in the competitive game. Matching methods include, for example, four types of matching methods: quick matching, conditional matching, friend matching, and designated matching. The user can arbitrarily select one from the four types of matching methods.

Figure 13:
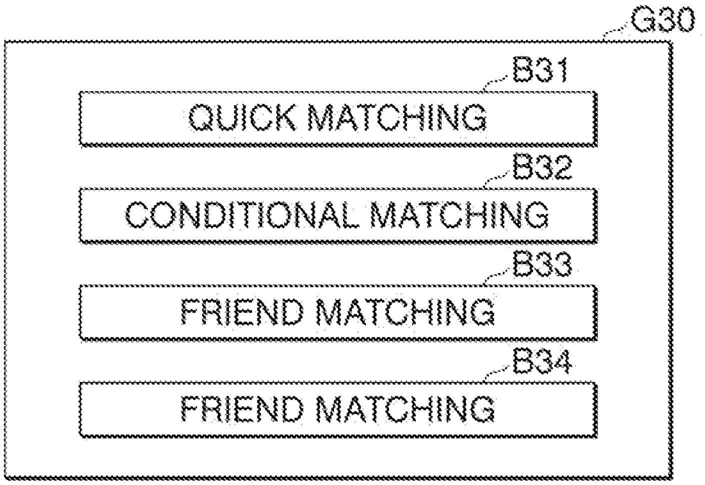
FIG. 13 is a diagram showing an example of a matching method selection screen according to a second embodiment.

FIG. 13 is a diagram showing an example of a matching method selection screen according to the present embodiment. The shown matching method selection screen G30 is displayed on the display unit 14 of the game device 10 for the user to select a matching method before starting a competitive play of this competitive game. An icon B31 is an operation button for selecting quick matching. An icon B32 is an operation button for selecting conditional matching. The icon B33 is an operation button for selecting friend matching. An icon B34 is an operation button for selecting designated matching. Whether the user participates as an attacker or a defender, the user selects a matching method by operating the matching method selection screen G30 shown in FIG. 13. After selecting either an attacker or a defender, the user selects a matching method on the matching method selection screen G30 shown in FIG. 13 and participates in the competitive game.

When the user has performed an operation to select one of the icons B31 to B34 on the game device 10, a competition request is transmitted from the game device 10 to the game server 30 and a matching process is performed by the game server 30 according to the selected matching method. When a match is established in the game server 30, the matching result is transmitted to the game device 10 and a competitive play is started. Each matching method will be described with reference to FIG. 14.

Figures 14, 15:
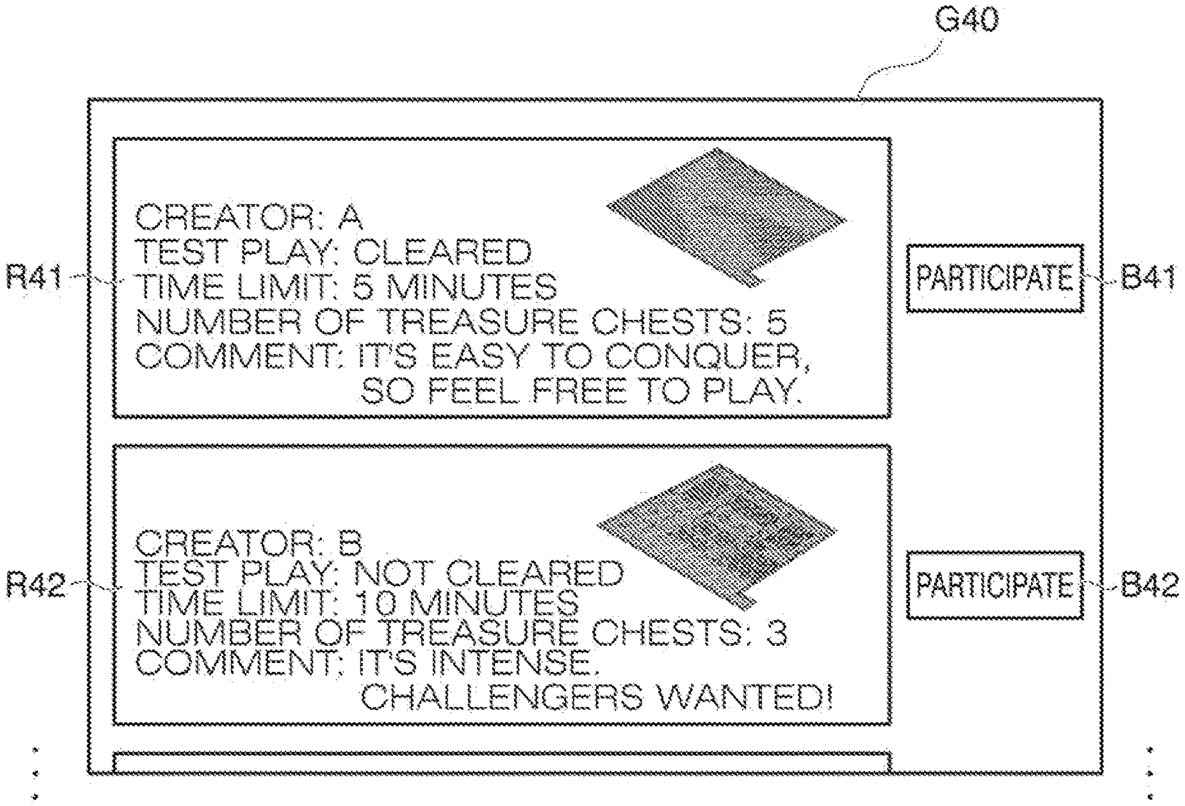
FIG. 14 is a diagram showing examples of matching methods according to the second embodiment.
FIG. 15 is a diagram showing an example of a room selection screen according to the second embodiment.

FIG. 14 is a diagram showing examples of matching methods according to the present embodiment. FIG. 14 shows a matching range and whether a room is selected in each matching method. The matching range is the range of users to be matched and determines whether to match with unspecified users or with specific users. Specific users are users who have a predetermined relationship (for example, a friend relationship) with the owner, users who are designated by an operation performed by the owner, or the like. Unspecified users are users who are not based on the specific users described above (including both specific users and users other than the specific users). Whether a room is selected is determined based on whether an attacking user can select a room in which he or she desires to participate (a game stage and users with which he or she or she desires to play).

Quick Matching

When a defending user selects quick matching, a game device 10 thereof transmits a competition request to the game server 30 for the user to participate as a defender in a competitive game using a game stage created by the user. If a plurality of game stages created by the user are saved, the user may select which game stage to use. When an attacking user selects quick matching, a game device 10 thereof transmits a competition request to the game server 30 to participate in the competitive game as an attacker. The game server 30 automatically performs matching with any defending user who has currently made a competition request. There are no particular conditions for users to be matched and matching is performed with unspecified users. The matching requires fairness since the opponents are basically strangers. Note that quick matching has no room selection.

Conditional Matching

Conditional matching matches unspecified users like quick matching, but has room selection for attacking users unlike quick matching. By creating a room, a defending user can recruit and invite attacking users to participate in a game stage that he or she has created. By selecting a room in which an attacking user desires to participate, the attacking user can participate in a competitive game using a game stage of that room.

FIG. 15 is a diagram showing an example of a room selection screen according to the present embodiment. The room selection screen G40 shown in FIG. 15 displays room labels R41, R42, . . . which contain information on rooms created by users who participate in a competitive game as a defender and icons B41, B42, . . . which are operation buttons for selecting participation in the rooms. Each room label displays the creator of the game stage (i.e., the room owner), the clearing status of a test play, game rules (such as a time limit and the number of treasure chests), comments by the creator (comments for attacking users), and the like. By checking details of the room label, an attacking user can participate in the competitive game after understanding, to some extent, what kind of game stage it is. For example, in the case of a game stage where a “test play” is “not cleared,” the attacking user can participate in a competitive game with the prior understanding that the game stage may be difficult (possibly impossible to clear), such that it is possible to reduce the feeling of absurdity that the user feels after actually participating in a competitive game against opponents.

Friend Matching

Friend matching has room selection like conditional matching, but limits attacking users to specific users who have a friend relationship with the defending user. As long as users have a friend relationship, they are allowed a certain degree of freedom in the game stage that is usable in a competitive game.

Designated Matching

Designated matching matches specific users, who are relatively close to the defending user such as acquaintances, as attacking users. For example, the defending user performs matching by directly specifying user IDs of attacking users. Here, each attacking user may enter a password predetermined with the defending user to participate in a competitive game using a game stage created by the defending user. Alternatively, game devices 10 may communicate with each other using short-range communication using Bluetooth (registered trademark), infrared rays, or the like, thereby matching users who can compete against each other. As long as users have a close relationship, there are basically no constraints (restrictions) on game stages that they can use in a competitive game. Note that designated matching has no room selection.

Figures 16, 17:
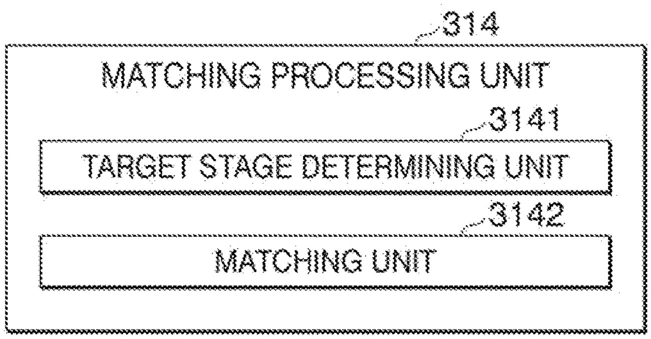
FIG. 16 is a diagram showing examples of constraints on game stages for each matching method according to the second embodiment.
FIG. 17 is a diagram showing an example of a functional configuration of a matching processing unit according to the second embodiment.

FIG. 16 is a diagram showing examples of constraints on game stages for each matching method according to the present embodiment. Each matching method has constraints on usable game stages. The level of difficulty of the game stage for attacking users differs depending on how the constraints are set.

The constraints on game stages are determined regarding the clearing status of a test play and the game rules. A game stage for which a test play has not yet been cleared may be a game stage for which a user who has created it has not been able to clear a test play or a game stage for which the user has not performed a test play. Thus, a game stage for which a test play has not been cleared may be more difficult than a game stage for which a test play has been cleared. If the condition of clearing a test play is not included in the constraints, difficult game stages will be included. Thus, by incorporating the condition that a test play has been cleared into the constraints on game stages, it is possible to eliminate at least game stages that are so difficult that attackers cannot win.

Constraints such as a time limit for a competitive play, the number of attacking users, the number of treasure chests, and the number of keys are set as those regarding the game rules. The longer the time limit, the lower the level of difficulty of the game stage for attacking users, and the shorter the time limit, the higher the level of difficulty of the game stage for attacking users. The smaller the number of attacking users, the lower the level of difficulty of the game stage for each attacking user, and the greater the number of attacking users, the higher the level of difficulty of the game stage for each attacking user. The greater the number of treasure chests, the lower the level of difficulty of the game stage for attacking users, and the smaller the number of treasure chests, the higher the level of difficulty of the game stage for attacking users. The greater the number of keys, the lower the level of difficulty of the game stage for attacking users, and the smaller the number of keys, the higher the level of difficulty of the game stage for attacking users. Providing these game rule constraints can adjust the levels of difficulty of usable game stages, compared to when there are no constraints.

In the shown example, game stages that are usable in “quick matching” are those for which a test play has been cleared, the time limit is 10 minutes or more, the number of attacking users is 10 or less, the number of treasure chests is 5 or more, and the number of keys is 7 or more. Game stages that are usable in “conditional matching” have no constraints on the clearing status of a test play, but are those for which the time limit is 5 minutes or more, the number of attacking users is 15 or less, the number of treasure chests is 3 or more, and the number of keys is 5 or more. Game stages that are usable in “friend matching” have no constraints on the clearing status of a test play, but are those for which the time limit is 5 minutes or more, the number of attacking users is 15 or less, the number of treasure chests is 2 or more, and the number of keys is 3 or more. Note that there are no constraints on game stages that are usable in “designated matching.”

That is, constraints for quick matching are set such that the level of difficulty of the game stage is the lowest and constraints for conditional matching are set such that the level of difficulty of the game stage is the second lowest.

Providing such constraints when matching with unspecified users can prevent competition on the game stage from becoming unreasonably difficult for unspecified opponents who are strangers.

On the other hand, friend matching is matching with users in a friend relationship rather than with strangers and therefore constraints for friend matching are set to allow for competitions in more difficult game stages, compared to quick matching and conditional matching. In designated matching, the defending user directly designates and matches attacking users who are his or her opponents and therefore no constraints are set therefor and users can compete against each other using game stages of any level of difficulty.

Constraints on game stages usable for a competitive play among a plurality of game stages are set according to the matching method as described above. Constraints on game stages usable for a competitive play differ depending on whether users to be matched are unspecified users and the constraints for matching with unspecified users are set such that the level of difficulty of the game stage for attacking users is lower, compared to matching with specific users.

In the example shown in FIG. 16, the constraints for a test play are set only for quick matching. In such a case, all or a part of the constraints of the game rules set in the quick matching may be included in the play content of the test play. For example, the play content of the test play may be set such that the time limit is 10 minutes, the number of treasure chests is 5, and the like to satisfy the conditions for quick matching. For example, by incorporating all constraints of the game rules for quick matching into the test play, the constraints on game stages in quick matching may be only that a test play has been cleared.

Configuration of Matching Process Unit

Next, details of the matching processing unit 314 included in the game server 30 will be described with reference to FIG. 17.

FIG. 17 is a diagram showing an example of a functional configuration of the matching processing unit 314 according to the present embodiment. The functional configuration of the matching processing unit 314 shown in FIG. 17 is a specific example of the matching processing unit 314 shown in FIG. 8. The matching processing unit 314 includes a target stage determining unit 3141 (an example of a stage determining unit) and a matching unit 3142.

The target stage determining unit 3141 determines game stages usable for a competitive play among a plurality of game stages according to a matching method selected from a plurality of matching methods with different matching ranges. For example, the target stage determining unit 3141 determines the constraints (see FIG. 16) on game stages usable for a competitive play among a plurality of game stages according to the selected matching method.

For example, matching ranges include a matching range in which unspecified users are matched and a matching range in which specific users are matched. The target stage determining unit 3141 determines the constraints such that the level of difficulty of the game stage usable for a competitive play differs depending on whether the matching method is a matching method whose matching range is a range of unspecified users (for example, quick matching or conditional matching) or a matching method whose matching range is a range of specific users (for example, friend matching or designated matching).

That is, the target stage determining unit 3141 determines the game stage usable for a competitive play such that the level of difficulty of the game stage usable for the competitive play differs based on whether the matching range is a range of unspecified users. More specifically, for example, the target stage determining unit 3141 determines constraints on usable game stages (constraints on the clearing status of a test play and game rules) such that the level of difficulty of a game stage usable for a competitive play differs for each of the four types of matching methods, quick matching, conditional matching, friend matching, and designated matching, as described with reference to FIG. 16.

The matching unit 3142 matches a defending user and attacking users who are to perform a competitive play using one of the usable game stages determined by the target stage determining unit 3141. For example, the matching unit 3142 matches a defending user and attacking users based on the selected matching method and the determined constraints on the game stage.

In the case of quick matching, the matching unit 3142 matches a user (a defending user) who has selected quick matching and made a competition request as a defender and users who have selected quick matching and made a competition request as an attacker. Here, users to be matched (a matching range) are unspecified users. Game stages that are usable are those that satisfy the constraints for quick matching shown in FIG. 16. For example, the matching unit 3142 selects users who have selected quick matching and made a competition request as an attacker as users to be matched with a user (a defending user) who has selected quick matching and made a competition request as a defender. Specifically, for example, the matching unit 3142 randomly selects users who have made a competition request as an attacker (such that each user is selected with an equal probability). The matching unit 3142 may select users who have made a competition request as an attacker in the order in which they have made a competition request. The matching unit 3142 selects the same number of attacking users as that of the game rules from the users selected as users to be matched and matches them with the defending user.

In the case of conditional matching, the matching unit 3142 selects a user (a defending user) who has selected conditional matching and made a competition request as a defender and users who have selected conditional matching and made a competition request as an attacker. Here, users to be matched (a matching range) are unspecified users as in quick matching. Game stages that are usable are those that satisfy the constraints for conditional matching shown in FIG. 16. For example, the game devices 10 of users, who have selected conditional matching and made a competition request as an attacker, display a selection screen (for example, the room selection screen G40 shown in FIG. 15) for allowing them to select a room created by a user (a defending user), who has selected conditional matching and made a competition request as a defender, and the matching unit 3142 matches a defending user and attacking users based on the results of room selection on the selection screen.

In the case of friend matching, the matching unit 3142 matches a user (a defending user) who has selected friend matching and made a competition request as a defender and users who have selected friend matching and made a competition request as an attacker. Here, users to be matched (a matching range) are users who have a friend relationship with each other. Game stages that are usable are those that satisfy the constraints for the friend matching shown in FIG. 16.

In the case of designated matching, the matching unit 3142 matches users specified by a user (a defending user), who has selected designated matching and made a competition request as a defender, as attacking users. The matching unit 3142 matches a user specified by a user (an attacking user), who has selected designated matching and made a competition request as an attacker, as a defending user. There are no restrictions on game stages that are usable.

Operation of Matching Process

Next, an operation of a matching process performed by the game system 1 will be described.

Figure 18:
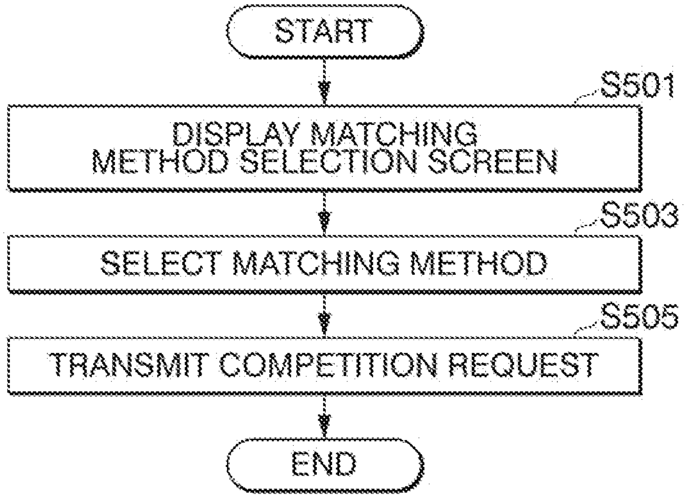
FIG. 18 is a flowchart showing an example of a competition request transmission process according to the second embodiment.

First, an operation of a competition request transmission process performed by the CPU 11 of the game device 10 will be described. FIG. 18 is a flowchart showing an example of a competition request transmission process according to the present embodiment. This competition request transmission process corresponds to a specific example of the process of step S301 in FIG. 11 or S401 in FIG. 12.

The CPU 11 controls the display on the display unit 14 to display the matching method selection screen G30 (see FIG. 13) (step S501). The CPU 11 selects a matching method from the four types of matching methods, quick matching, conditional matching, friend matching, and designated matching, based on an operation that the user has performed on the matching method selection screen G30 (step S503).

Then, the CPU 11 transmits a competition request to the game server 30 in association with information indicating the selected matching method (step S505). For example, when participating in a competitive game as an attacker, the CPU 11 transmits a competition request for participating as an attacker to the game server 30 in association with information indicating the selected matching method. On the other hand, when participating in a competitive game as a defender, the CPU 11 transmits a competition request for participating as a defender to the game server 30 in association with information indicating the selected matching method. If a plurality of game stages created by the defending user are stored, a competition request may be transmitted to the game server 30 in association with selection information of a game stage to be used.

Figure 19:
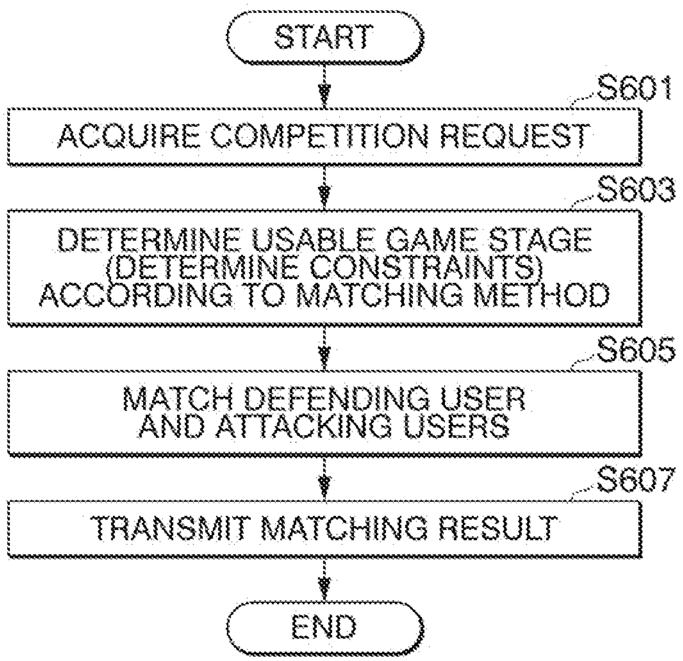
FIG. 19 is a flowchart showing an example of a matching process according to the second embodiment.

Next, an operation of a matching process performed by the CPU 31 of the game server 30 will be described. FIG. 19 is a flowchart showing an example of a matching process according to the present embodiment.

The CPU 31 acquires the competition request transmitted from the game device 10 (step S601). For example, the CPU 31 acquires competition requests for participating as an attacker and competition requests for participating as a defender transmitted from the plurality of game devices 10.

The CPU 31 determines game stages usable for a competitive play among a plurality of game stages according to a matching method associated with a competition request acquired in step S601 (a matching method selected by a user participating as a defender or an attacker) (step S603). For example, the CPU 31 determines constraints on game stages usable for a competitive play based on the selected matching method.

Next, the CPU 31 matches a defending user and attacking users who are to perform a competitive play using one of the usable game stages determined in step S603 (step S605). For example, the CPU 31 matches a defending user and attacking users who are to perform a competitive play using one of the usable game stages, which satisfy the constraints on the usable game stages, determined in step S603 based on the selected matching method and the determined constraints on the game stages. Specifically, for example, if the selected matching method is quick matching, the CPU 31 randomly extracts and matches a defending user and attacking users from defending users and attacking users who have made a competition request in quick matching. For example, if the selected matching method is conditional matching, the CPU 31 matches attacking users who have made a competition request for a room with an owner (a defending user) who has created the room on a first-come, first-served basis until the room is filled to capacity. When the selected matching method is friend matching, this differs from the conditional matching in that, for example, the room is open only to users (for example, friends) who have a predetermined relationship with the owner (defending user). For example, in the case of friend matching, the CPU 31 matches friends (attacking users) who have made a competition request for a room with an owner (a defending user) who has created the room on a first-come, first-served basis until the room is filled to capacity.

When a user creates a room, the CPU 31 may notify users (for example, friends) who have a predetermined relationship with the user of an invitation to the room (an invitation to a competition).

Then, the CPU 31 transmits the matching result including user information of the matched defending user, user information of the matched attacking users, information on the game stage used in a competitive play, and the like to game devices 10 of the matched users (step S607).

Summary of Second Embodiment

As described above, the game system 1 according to the present embodiment includes a game device 10 and a game server 30 that communicates with the game device 10 and performs a matching process to match opponents in a competitive game in which an attacking user and a defending user play a competitive play using a game stage created by the defending user. The defending user is able to create a plurality of game stages. The game server 30 includes a matching processing unit 314 that performs a matching process. For example, the matching processing unit 314 includes a target stage determining unit 3141 (an example of a stage determining unit) and a matching unit 3142. The target stage determining unit 3141 determines game stages usable for the competitive play among the plurality of game stages according to a matching method selected from a plurality of matching methods with different ranges of users to be matched (for example, different matching ranges). The matching unit 3142 matches a defending user and an attacking user that are to perform the competitive play using one of the usable game stages determined by the target stage determining unit 3141.

Accordingly, in a competitive game in which users compete against each other using a game stage created by a user, the game system 1 determines the game stages usable for the competitive play according to the range of users to be matched and therefore can reduce user dissatisfaction regarding the game stage.

For example, the target stage determining unit 3141 determines the game stages usable for the competitive play based on whether the users to be matched are unspecified users.

Accordingly, the game system 1 can make the game stages usable for the competitive play different when matching with unspecified users and when matching with specific users and therefore can reduce user dissatisfaction regarding the game stage.

The present embodiment has been described with reference to an example in which, when a user selects a matching method, game stages usable for a competitive play are determined such that the level of game stages usable for a competitive play differs based on whether users to be matched (a matching range) in the selected matching method are unspecified users. However, conversely, when a user selects a game stage, usable matching methods may be presented such that they are selectable according to the selected game stage.

The defending user who has created the game stage is able to perform a test play of the competitive play as an attacking user using the game stage created by the defending user. The level of difficulty of the game stage for the attacking user differs depending on whether the attacking user was able to win the test play. The target stage determining unit 3141 determines the game stages usable for the competitive play such that the level of difficulty of the game stages usable for the competitive play differs depending on whether the users to be matched are unspecified users.

Accordingly, the game system 1 determines the level of difficulty of the game stage created by the defending user based on the clearing status of the test play and can make the level of difficulty of the game stages usable for the competitive play different when matching with unspecified users and when matching with specific users and therefore can reduce user dissatisfaction regarding the game stage.

The level of difficulty of the game stage for the attacking user differs depending on a game rule for performing the competitive play that the defending user has set in the game stage. The target stage determining unit 3141 determines the game stages usable for the competitive play such that the level of difficulty of the game stages usable for the competitive play differs depending on whether the users to be matched are unspecified users.

Accordingly, the game system 1 determines the level of difficulty of the game stage created by the defending user based on the game rule and can make the level of difficulty of the game stages usable for the competitive play different when matching with unspecified users and when matching with specific users and therefore can reduce user dissatisfaction regarding the game stage.

The game rule includes a constraint on the number of attacking users.

Accordingly, the game system 1 determines the level of difficulty of the game stage created by the defending user based on the constraint on the number of attacking users and can make the level of difficulty of the game stages usable for the competitive play different when matching with unspecified users and when matching with specific users.

One or more treasure chests (examples of specific objects) are placed in the game stage and winning or losing of the defending user and the attacking user is determined based on a status of acquiring treasure chests by the attacking user in the competitive play until a time limit (an example of a predetermined time) elapses from start of the competitive play. Then, the game rule includes a constraint on the number of treasure chests placed in the game stage or a constraint on the time limit.

Accordingly, the game system 1 determines the level of difficulty of the game stage created by the defending user based on the constraint on the number of treasure chests placed in the game stage or a constraint on the time limit and can make the level of difficulty of the game stages usable for the competitive play different when matching with unspecified users and when matching with specific users.

A key (an example of an item) necessary for the attacking user to acquire a treasure chest is placed in the game stage such that the attacking user can acquire the key and the game rule includes a constraint on the number of keys placed in the game stage.

Accordingly, the game system 1 determines the level of difficulty of the game stage created by the defending user based on the constraint on the number of keys placed in the game stage and can make the level of difficulty of the game stages usable for the competitive play different when matching with unspecified users and when matching with specific users.

The defending user is able to customize, when creating the game stage, at least a block (an example of a restrictive object) in the game stage that restricts movement of a character that moves in accordance with an operation performed by the attacking user.

Accordingly, in the game system 1, when creating a game stage, the defending user can adjust the level of difficulty of the game stage using the number and positions of blocks in the game stage.

When there are a plurality of game stages created by the defending user, the game system 1 presents them to the attacking user such that only game stages usable for a competitive play are selectable according a matching method.

Accordingly, the game system 1 can make it easier for an attacking user to select a defending user to compete against when participating in a competitive game.

Modifications

Although embodiments of the present invention have been described above in detail with reference to the drawings, the specific configurations thereof are not limited to the above embodiments and also include designs or the like without departing from the spirit of the present invention. For example, the above configurations can be combined arbitrarily.

Although the above embodiments have been described with reference to an example of a specification in which an attacking user cannot acquire a treasure chest unless he or she possesses a key, it is also possible to adopt a specification in which no key is required to acquire a treasure chest. Also, although the attacking user satisfies the winning condition by acquiring a treasure chest due to reaching the treasure chest in the above embodiments, the attacking user may satisfy the winning condition by reaching a treasure chest.

Further, although the above embodiments have been described with reference to an example in which the winning condition is that the attacking user acquires one treasure chest, the number of treasure chests required to be acquired is not limited to one and may be plural. Namely, the winning condition for the attacking user may be that the attacking user acquires a plurality of (for example, two or three) treasure chests. The greater the number of treasure chests that the attacking user need to acquire in order to win, the higher the level of difficulty for the attacking user to win.

Furthermore, although the defending user operates a character in a competitive play similar to the attacking user in the above embodiments, the defending user does not necessarily have to have a character to be operated. For example, the defending user may merely see if the defending user can protect treasure chests within the time limit through traps or the like set in a game stage that the defending user has created. Alternatively, the only element that the defending user intervenes in the competitive play may be an operation performed to operate weapons such as cannons and traps (for example, firing cannons, making NPCs appear, and activating traps that cause blocks to fall).

All or a part of the processing of the game processing unit 110 or the server processing unit 310 described above may be performed by recording a program for implementing the functions of the game processing unit 110 or the server processing unit 310 on a computer-readable recording medium and causing a computer system to read and execute the program recorded on the recording medium. Here, "causing a computer system to read and execute the program recorded on the recording medium" includes installing the program on the computer system. The term "computer system" referred to here includes an OS or hardware such as peripheral devices. The "computer system" may include a plurality of computer devices connected via the Internet, a WAN, a LAN, or a network including a communication line such as a dedicated line. The term "computer readable recording medium" refers to a portable medium such as a flexible disk, a magneto-optical disc, a ROM, or a CD-ROM, a storage device such as a hard disk provided in the computer system, or the like. In this way, the recording medium storing the program may be a non-transitory recording medium such as a CD-ROM. The recording medium also includes an internally or externally provided recording medium that a distribution server can access to distribute the program. The code of the program stored in the recording medium of the distribution server may differ from the code of a program in a format that can be executed by a terminal device. That is, the format in which the program is stored in the distribution server does not matter as long as it can be downloaded from a distribution server and installed on a terminal device in an executable form. A configuration in which a program is divided into a plurality of parts and the plurality of parts are combined on a terminal device after being downloaded at different times may also be employed and the plurality of parts into which the program is divided may be distributed by different distribution servers. The "computer readable recording medium" is assumed to include something that holds a program for a certain period of time, like an internal volatile memory (RAM) of a computer system that serves as a server or a client in the case where the program is transmitted via a network. The program described above may be one for implementing some of the above-described functions. The program may also be a so-called difference file (difference program) that can implement the above-described functions in combination with a program already recorded in the computer system.

Also, all or a part of the game processing unit 110 or the server processing unit 310 may be implemented as an integrated circuit such as large scale integration (LSI). The functions described above may be individually implemented as processors or some or all of the functions may be integrated and implemented as a processor. The circuit integration is not limited to LSI and may be implemented by a dedicated circuit or a general-purpose processor. If an integrated circuit technology that replaces LSI emerges due to advances in semiconductor technology, an integrated circuit based on the technology may be used.

The server processing unit 310 may include some components of the game processing unit 110 described above. For example, the game server 30 may be responsible for most of game processing and the game device 10 may be responsible for receiving user operations and displaying game images based on game processing performed by the game server 30.

The game server 30 may be integrated into one computer device or may be distributed over a plurality of computer devices. For example, the game server 30 may be distributed over a plurality of computer devices connected via the network NW. In an example, a server that performs the matching process of the game server 30 and a server that performs game processing may be distributed over different computer devices. After the game server 30 performs a matching process, the matched game devices 10 may perform P2P communication to play a competitive game.

At least some components included in the game processing unit 110 of the game device 10 may be included in the game server 30. For example, it is possible to adopt a so-called cloud game configuration in which each game device 10 merely receives a user operation, draws a video on a game screen, and reproduces audio and the game server 30 performs game processing including generation of drawing data and audio data.

Supplements A

From the above description, the present invention can be understood, for example, as follows. The reference numerals of the accompanying drawings are conveniently added in parentheses to facilitate understanding of the present invention, but the present invention is not limited to the shown embodiments.

For example, one of the most exciting aspects of the competitive game where a defending user and attacking users compete against each other using a game stage created by the defending user is that a plurality of attacking users cooperate in playing to conquer a game stage created by a defending user. On the other hand, however, some users find such cooperative play troublesome.

It is one of the objects of some aspects of the present invention to provide a game program, a game processing method, and a game system that reduce the cooperative element between users in a competitive game played by a plurality of users.

Supplement A1

A game program according to an aspect of the present invention is a game program that performs processing of a competitive game between a plurality of attacking users and at least one defending user, the game program causing a computer to perform moving each of characters of the plurality of attacking users in a game space (for example, a game field GF) created by the defending user based on an operation performed by a corresponding one of the plurality of attacking users in a competitive play in the competitive game (S103, S203), causing an attacking user among the plurality of attacking users who operates a character to acquire a specific object (for example, a treasure chest) placed in the game space due to the character operated by the attacking user reaching the specific object (S211), determining that a winning condition for the attacking user who has acquired the specific object among the plurality of attacking users is satisfied and ending the competitive play for the attacking user and continuing the competitive play for the other attacking users (S307, S309, S311), and determining that a winning condition for the defending user is satisfied and ending the competitive play for all of the defending user and the attacking users when a remaining status of the specific objects that remain not acquired by the attacking users is kept from reaching a predetermined remaining status (for example, the number of remaining treasure chests being zero) until a predetermined time (for example, a time limit) elapses from start of the competitive play (S413, S315).

According to the configuration of supplement A1, it is possible to provide a game with a reduced cooperative element between users in a competitive game between a plurality of users, because the game is basically an individual game even if it is a competitive game between a plurality of attacking users and a defending user. Thus, users do not need to cooperate, consult, or the like with other users as teammates and can easily participate in a competitive game.

Supplement A2

An aspect of the present invention is the game program according to supplement A1, further causing the computer to perform determining that a winning condition for all of the attacking users is satisfied and ending the competitive play for all of the defending user and the attacking users when all of the plurality of attacking users have acquired the specific object (for example, the treasure chest) before the predetermined time (for example, the time limit) elapses (S309, S411).

According to the configuration of supplement A2, while it is possible to provide an individual game because the winning or losing of each attacking user and the defending user is determined based on whether each of the plurality of attacking users has acquired a specific object (for example, treasure chest) within the predetermined time (for example, the time limit), it is also possible to provide a team game element because the final losing of the defending user is determined by the play results of all attacking users.

Supplement A3

An aspect of the present invention is the game program according to supplement A1 or A2, wherein an item (for example, a key) necessary for the attacking user to acquire the specific object (for example, the treasure chest) is placed in the game space (for example, the game field GF) such that the attacking user is able to acquire the item, and causing the attacking user who operates the character to acquire the specific object includes causing the attacking user who operates the character to acquire one of a plurality of specific objects placed in the game space due to the character which has acquired the item reaching the one of the plurality of specific objects.

According to the configuration of supplement A3, it is possible to increase the number of elements for conquering the game space (for example, the game field GF), improving the game properties, because the attacking user does not merely head to the location of a specific object (for example, a treasure chest).

Supplement A4

An aspect of the present invention is the game program according to supplement A3, wherein the attacking user is able to acquire the item (for example, the key) placed in the game space (for example, the game field GF) and an item already acquired by another attacking user.

According to the configuration of supplement A4, it is possible to increase the level of difficulty to head to a specific object (for example, a treasure chest) with an item (for example, a key) acquired because attacking users can struggle with each other for the item (for example, the key).

Supplement A5

An aspect of the present invention is the game program according to supplement A3 or A4, wherein the item (for example, the key) placed in the game space (for example, the game field GF) is newly placed in the game space based on a predetermined additional condition.

According to the configuration of supplement A5, it is possible to encourage attacking users to struggle with each other for items (for example, keys) by keeping the number of items (for example, keys) smaller than the number of specific objects (for example, treasure chests) at the start of the competitive play.

Supplement A6

An aspect of the present invention is the game program according to supplement A5, wherein the predetermined additional condition is a condition based on a passage of time from the start of the competitive play.

According to the configuration of supplement A6, it is possible to encourage attacking users to struggle with each other for items (for example, keys) by keeping the number of keys (for example, keys) smaller than the number of treasure chests specific objects (for example, treasure chests) at the start of the competitive play.

Supplement A7

An aspect of the present invention is the game program according to any one of supplements A1 to A6, wherein the defending user is able to customize at least a restrictive object (for example, a block) that restricts movement of the character in the game space (for example, the game field GF) when creating the game space.

According to the configuration of supplement A7, it is possible to create a game space (for example, a game field GF) by adjusting the level of difficulty of movement of the attacking user's character. For example, the defending user can create a plurality of game spaces (for example, game fields GF) with different levels of difficulty, such that it is possible to use a game space (for example, a game field GF) with a different level of difficulty for each competition.

Supplement A8

A game processing method according to an aspect of the present invention is a game processing method performed by a computer that performs processing of a competitive game between a plurality of attacking users and at least one defending user, the game processing method including moving each of characters of the plurality of attacking users in a game space (for example, a game field GF) created by the defending user based on an operation performed by a corresponding one of the plurality of attacking users in a competitive play in the competitive game (S103, S203), causing an attacking user among the plurality of attacking users who operates a character to acquire a specific object (for example, a treasure chest) placed in the game space due to the character operated by the attacking user reaching the specific object (S211), determining that a winning condition for the attacking user who has acquired the specific object among the plurality of attacking users is satisfied and ending the competitive play for the attacking user and continuing the competitive play for the other attacking users (S307, S309, S311), and determining that a winning condition for the defending user is satisfied and ending the competitive play for all of the defending user and the attacking users when a remaining status of the specific objects that remain not acquired by the attacking users is kept from reaching a predetermined remaining status (for example, the number of remaining treasure chests being zero) until a predetermined time (for example, a time limit) elapses from start of the competitive play (S413, S315).

According to the configuration of supplement A8, it is possible to provide a game with a reduced cooperative element between users in a competitive game between a plurality of users, because the game is basically an individual game even if it is a competitive game between a plurality of attacking users and a defending user. Thus, users do not need to cooperate, consult, or the like with other users as teammates and can easily participate in a competitive game.

Supplement A9

A game system (1) according to an aspect of the present invention is a game system including a game device (10) and a game server (30) that communicates with the game device and performing processing of a competitive game between a plurality of attacking users and at least one defending user, the game system including a character control unit (S103, S203) configured to move each of characters of the plurality of attacking users in a game space (for example, a game field GF) created by the defending user based on an operation performed by a corresponding one of the plurality of attacking users in a competitive play in the competitive game, an acquisition management unit (S211) configured to cause an attacking user among the plurality of attacking users who operates a character to acquire a specific object (for example, a treasure chest) placed in the game space due to the character operated by the attacking user reaching the specific object, and a play management unit (117) configured to determine that a winning condition for the attacking user who has acquired the specific object among the plurality of attacking users is satisfied and end the competitive play for the attacking user and continue the competitive play for the other attacking users (S307, S309, S311) and then to determine that a winning condition for the defending user is satisfied and end the competitive play for all of the defending user and the attacking users when a remaining status of the specific objects that remain not acquired by the attacking users is kept from reaching a predetermined remaining status (for example, the number of remaining treasure chests being zero) until a predetermined time (for example, a time limit) elapses from start of the competitive play (S413, S315).

According to the configuration of supplement A9, it is possible to provide a game with a reduced cooperative element between users in a competitive game between a plurality of users, because the game is basically an individual game even if it is a competitive game between a plurality of attacking users and a defending user. Thus, users do not need to cooperate, consult, or the like with other users as teammates and can easily participate in a competitive game.

Supplements B

From the above description, the present invention can also be understood, for example, as follows. The reference numerals of the accompanying drawings are conveniently added in parentheses to facilitate understanding of the present invention, but the present invention is not limited to the shown embodiments.

For example, in a competitive game in which users compete against each other using a game stage created by a user, the level of difficulty of the created game stage may not be appropriate or the level of difficulty may be intentionally set to be too high. Therefore, other users who play using such a game stage may be dissatisfied with the game stage.

It is one of the objects of some aspects of the present invention to provide a game program, a game processing method, and a game system that reduce user dissatisfaction regarding a game stage in a competitive game in which users compete against each other using the game stage created by a user.

Supplement B1

A game program according to an aspect of the present invention is a game program that performs a matching process to match opponents in a competitive game in which an attacking user and a defending user play a competitive play using a game stage created by the defending user, wherein the defending user is able to create a plurality of game stages and the game program causes a computer to perform determining game stages usable for the competitive play among the plurality of game stages according to a matching method selected from a plurality of matching methods with different ranges of users to be matched (for example, different matching ranges) (S603) and matching the defending user and the attacking user that perform the competitive play using one of the determined usable game stages (S605).

According to the configuration of supplement B1, in a competitive game in which users compete against each other using a game stage created by a user, the game stages usable for the competitive play are determined according to the range of users to be matched and therefore user dissatisfaction regarding the game stage can be reduced.

Supplement B2

An aspect of the present invention is the game program according to supplement B1, wherein the determining includes determining the game stages usable for the competitive play based on whether the users to be matched are unspecified users.

According to the configuration of supplement B2, the game stages usable for the competitive play can be made different when matching with unspecified users and when matching with specific users and therefore user dissatisfaction regarding the game stage can be reduced.

Supplement B3

An aspect of the present invention is the game program according to supplement B1 or B2, wherein the defending user who has created the game stage is able to perform a test play of the competitive play as an attacking user using the game stage created by the defending user and the level of difficulty of the game stage for the attacking user differs depending on whether the attacking user was able to win the test play and the determining includes determining the game stages usable for the competitive play such that the level of difficulty of the game stages usable for the competitive play differs depending on whether the users to be matched are unspecified users.

According to the configuration of supplement B3, the level of difficulty of the game stage created by the defending user is determined based on whether the attacking user was able to win the test play and the level of difficulty of the game stages usable for the competitive play can be made different when matching with unspecified users and when matching with specific users and therefore user dissatisfaction regarding the game stage can be reduced.

Supplement B4

An aspect of the present invention is the game program according to any one of supplements B1 to B3, wherein the level of difficulty of the game stage for the attacking user differs depending on a game rule for performing the competitive play that the defending user has set in the game stage and the determining includes determining the game stages usable for the competitive play such that the level of difficulty of the game stages usable for the competitive play differs depending on whether the users to be matched are unspecified users.

According to the configuration of supplement B4, the level of difficulty of the game stage created by the defending user is determined based on the game rule and the level of difficulty of the game stages usable for the competitive play can be made different when matching with unspecified users and when matching with specific users and therefore user dissatisfaction regarding the game stage can be reduced.

Supplement B5)

An aspect of the present invention is the game program according to supplement B4, wherein the game rule includes a constraint on the number of attacking users.

According to the configuration of supplement B5, the level of difficulty of the game stage created by the defending user is determined based on the constraint on the number of attacking users and the level of difficulty of the game stages usable for the competitive play can be made different when matching with unspecified users and when matching with specific users.

Supplement B6

An aspect of the present invention is the game program according to supplement B4 or B5, wherein one or more specific objects (for example, treasure chests) are placed in the game stage, winning or losing of the defending user and the attacking user is determined based on a status of acquiring the specific objects by the attacking user in the competitive play until a predetermined time (for example, a time limit) elapses from start of the competitive play, and the game rule includes a constraint on the number of specific objects placed in the game stage or a constraint on the predetermined time.

According to the configuration of supplement B6, the level of difficulty of the game stage created by the defending user is determined based on the constraint on the number of specific objects (for example, treasure chests) placed in the game stage or a constraint on the time from the start of the competitive play and the level of difficulty of the game stages usable for the competitive play can be made different when matching with unspecified users and when matching with specific users.

Supplement B7

An aspect of the present invention is the game program according to supplement B6, wherein an item (for example, a key) necessary for the attacking user to acquire the specific object (for example, a treasure chest) is placed in the game stage such that the attacking user can acquire the item and the game rule includes a constraint on the number of items placed in the game stage.

According to the configuration of supplement B7, the level of difficulty of the game stage created by the defending user is determined based on the constraint on the number of items (for example, keys) placed in the game stage and the level of difficulty of the game stages usable for the competitive play can be made different when matching with unspecified users and when matching with specific users.

Supplement B8

An aspect of the present invention is the game program according to any one of supplements B5 to B7, wherein the defending user is able to customize, when creating the game stage, at least a restrictive object (for example, a block) in the game stage that restricts movement of a character that moves in accordance with an operation performed by the attacking user.

According to the configuration of supplement B8, when creating a game stage, the defending user can adjust the level of difficulty of the game stage using the number and positions of restrictive objects (for example, blocks) in the game stage.

Supplement B9

A game processing method according to an aspect of the present invention is a game processing method performed by a computer that performs a matching process to match opponents in a competitive game in which an attacking user and a defending user play a competitive play using a game stage created by the defending user, wherein the defending user is able to create a plurality of game stages and the game processing method includes determining game stages usable for the competitive play among the plurality of game stages according to a matching method selected from a plurality of matching methods with different ranges of users to be matched (for example, different matching ranges) (S603) and matching the defending user and the attacking user that perform the competitive play using one of the determined usable game stages (S605).

According to the configuration of supplement B9, in a competitive game in which users compete against each other using a game stage created by a user, the game stages usable for the competitive play are determined according to the range of users to be matched and therefore user dissatisfaction regarding the game stage can be reduced.

Supplement B10

A game system according to an aspect of the present invention is a game system including a game device (10) configured to perform processing of a competitive game in which an attacking user and a defending user play a competitive play using a game stage created by the defending user and a game server (30) configured to perform a matching process for matching opponents in the competitive game, wherein the defending user is able to create a plurality of game stages and the game server includes a game stage determining unit (3141, S603) configured to determine game stages usable for the competitive play among the plurality of game stages according to a matching method selected from a plurality of matching methods with different ranges of users to be matched (for example, different matching ranges)

and a matching unit (3142, S605) configured to match the defending user and the attacking user that perform the competitive play using one of the determined usable game stages.

According to the configuration of supplement B10, in a competitive game in which users compete against each other using a game stage created by a user, the game stages usable for the competitive play are determined according to the range of users to be matched and therefore user dissatisfaction regarding the game stage can be reduced.

EXPLANATION OF REFERENCES

1 Game system
10 Game device
11 CPU
12 Communication unit
13 Input unit
14 Display unit
15 Storage unit
30 Game server
31 CPU
32 Communication unit
35 Storage unit
110 Game processing unit
111 Game stage management unit
112 Competition request unit
113 Play progress management unit
114 Game data exchange unit
115 Character control unit
116 Acquisition management unit
117 Play management unit
118 Display control unit
151 User data storage unit
152 Game stage storage unit
153 Possession data storage unit
310 Server processing unit
311 Server-side game processing unit
312 Game stage management unit
313 Game data exchange unit
314 Matching processing unit
3141 Target stage determining unit
3142 Matching unit
351 User data storage unit
352 Game stage storage unit
353 Possession data storage unit

What is claimed is:

1. A non-transitory computer-readable medium storing computer-executable instructions that when executed by one or more computers, cause the one or more computers to perform a method of processing a competitive play in a competitive game between a plurality of attacking users and at least one defending user, the method comprising:

displaying, on a display device, a room selection screen comprising a plurality of room labels, each room label corresponding to a game stage created by a respective defending user and displaying summary information including a creator of the game stage, a clearing status of a test play, and game rule parameters, and a plurality of selectable participation buttons, each associated with a respective one of the plurality of room labels;

responsive to selection of one of the plurality of selectable participation buttons by an attacking user, initiating participation in the competitive game using the game stage corresponding to the selected participation button;

moving, in a game space created by the defending user, each of a plurality of characters respectively associated with the plurality of attacking users, based on a respective set of operations performed by a respective one of the plurality of attacking users;

causing an attacking user among the plurality of attacking users, who operates a character associated with the attacking user to acquire at least a specific object placed in the game space due to the character operated by the attacking user having reached the specific object;

determining that a winning condition for the attacking user who has acquired the specific object among the plurality of attacking users is satisfied and ending a competitive play for the attacking user who has acquired the specific object and continuing other competitive plays for the other attacking users who have not yet acquired the specific object; and determining that a winning condition for the defending user is satisfied and ending the competitive play for all of the defending user and the attacking users in case that a remaining status of the specific objects that remain not yet acquired by the attacking users is kept from reaching a predetermined remaining status until a predetermined time elapses from start of the competitive play.

2. The non-transitory computer-readable medium according to claim 1, further comprising:

determining that a winning condition for all of the attacking users is satisfied and ending the competitive play for all of the defending user and the attacking users when all of the plurality of attacking users have acquired the specific object before the predetermined time elapses.

3. The non-transitory computer-readable medium according to claim 1, wherein an item necessary for the attacking user to acquire the specific object is placed in the game space to allow the attacking user to acquire the item, and wherein causing the attacking user to acquire at least the specific object comprises:

causing the attacking user who operates the character to acquire one of a plurality of specific objects placed in the game space due to the character which has acquired the item reaching the one of the plurality of specific objects.

4. The non-transitory computer-readable medium according to claim 3, further comprising:

allowing the attacking user to acquire the item placed in the game space and to acquire another item already acquired by another attacking user.

5. The non-transitory computer-readable medium according to claim 3, wherein the item to be placed in the game space is newly placed in the game space based on a predetermined set of one or more additional conditions.

6. The non-transitory computer-readable medium according to claim 5, wherein the predetermined set of one or more additional conditions is based on a passage of time from the start of the competitive play.

7. The non-transitory computer-readable medium according to claim 1, further comprising:

displaying, on the display device, a game stage creation screen comprising a game field and a plurality of selectable icons, each icon corresponding to a different type of object installable in the game field;

responsive to selection of one of the plurality of selectable icons, displaying a description of the selected type of object;

responsive to a cursor movement operation, moving a cursor to a position on the game field; and responsive to an installation operation, installing an object of the selected type at the position of the cursor in the game field.

8. The non-transitory computer-readable medium according to claim 7, further comprising:

allowing the defending user to customize at least a restrictive object that restricts movement of the character in the game space when creating the game space.

9. A game processing method performed by one or more computers that perform a method of processing a competitive play in a competitive game between a plurality of attacking users and at least one defending user, the method comprising:

displaying, on a display device, a room selection screen comprising a plurality of room labels, each room label corresponding to a game stage created by a respective defending user and displaying summary information including a creator of the game stage, a clearing status of a test play, and game rule parameters, and a plurality of selectable participation buttons, each associated with a respective one of the plurality of room labels;

responsive to selection of one of the plurality of selectable participation buttons by an attacking user, initiating participation in the competitive game using the game stage corresponding to the selected participation button;

moving, in a game space created by the defending user, each of a plurality of characters respectively associated with the plurality of attacking users, based on a respective set of operations performed by a respective one of the plurality of attacking users;

causing an attacking user among the plurality of attacking users, who operates a character associated with the attacking user to acquire at least a specific object placed in the game space due to the character operated by the attacking user having reached the specific object;

determining that a winning condition for the attacking user who has acquired the specific object among the plurality of attacking users is satisfied and ending a competitive play for the attacking user who has acquired the specific object and continuing other competitive plays for the other attacking users who have not yet acquired the specific object; and determining that a winning condition for the defending user is satisfied and ending the competitive play for all of the defending user and the attacking users in case that a remaining status of the specific objects that remain not yet acquired by the attacking users is kept from reaching a predetermined remaining status until a predetermined time elapses from start of the competitive play.

10. The game processing method according to claim 9, further comprising:

displaying, on the display device, a game stage creation screen comprising a game field and a plurality of selectable icons, each icon corresponding to a different type of object installable in the game field;

responsive to selection of one of the plurality of selectable icons, displaying a description of the selected type of object;

responsive to a cursor movement operation, moving a cursor to a position on the game field; and responsive to an installation operation, installing an object of the selected type at the position of the cursor in the game field.

11. A game system comprising:

one or more computers; and one or more memories that store computer-executable instructions that when executed by the one or more computers, cause the one or more computers to perform a method of processing a competitive play in a competitive game between a plurality of attacking users and at least one defending user, the method comprising:

displaying, on a display device, a room selection screen comprising a plurality of room labels, each room label corresponding to a game stage created by a respective defending user and displaying summary information including a creator of the game stage, a clearing status of a test play, and game rule parameters, and a plurality of selectable participation buttons, each associated with a respective one of the plurality of room labels;

responsive to selection of one of the plurality of selectable participation buttons by an attacking user, initiating participation in the competitive game using the game stage corresponding to the selected participation button;

moving, in a game space created by the defending user, each of a plurality of characters respectively associated with the plurality of attacking users, based on a respective set of operations performed by a respective one of the plurality of attacking users;

causing an attacking user among the plurality of attacking users, who operates a character associated with the attacking user to acquire at least a specific object placed in the game space due to the character operated by the attacking user having reached the specific object;

determining that a winning condition for the attacking user who has acquired the specific object among the plurality of attacking users is satisfied and ending a competitive play for the attacking user who has acquired the specific object and continuing other competitive plays for the other attacking users who have not yet acquired the specific object; and determining that a winning condition for the defending user is satisfied and ending the competitive play for all of the defending user and the attacking users in case that a remaining status of the specific objects that remain not yet acquired by the attacking users is kept from reaching a predetermined remaining status until a predetermined time elapses from start of the competitive play.

12. The game system according to claim 11, wherein the method further comprises:

displaying, on the display device, a game stage creation screen comprising a game field and a plurality of selectable icons, each icon corresponding to a different type of object installable in the game field;

responsive to selection of one of the plurality of selectable icons, displaying a description of the selected type of object;

responsive to a cursor movement operation, moving a cursor to a position on the game field; and responsive to an installation operation, installing an object of the selected type at the position of the cursor in the game field.

13. A non-transitory computer-readable medium storing computer-executable instructions that when executed by one or more computers, cause the one or more computers to perform a method comprising:

displaying, on a display device, a game stage creation screen comprising a game field and a plurality of selectable icons, each icon corresponding to a different type of object installable in the game field;

responsive to selection of one of the plurality of selectable icons, displaying a description of the selected type of object;

responsive to a cursor movement operation, moving a cursor to a position on the game field; and responsive to an installation operation, installing an object of the selected type at the position of the cursor in the game field.

14. The non-transitory computer-readable medium according to claim 13, further comprising:

displaying, on the display device, a room selection screen comprising a plurality of room labels, each room label corresponding to a game stage created by a respective defending user and displaying summary information including a creator of the game stage, a clearing status of a test play, and game rule parameters, and a plurality of selectable participation buttons, each associated with a respective one of the plurality of room labels; and responsive to selection of one of the plurality of selectable participation buttons by an attacking user, initiating participation in a competitive game using the game stage corresponding to the selected participation button.

* * * * *